United States Patent
Oosaki et al.

(10) Patent No.: US 10,899,935 B2
(45) Date of Patent: Jan. 26, 2021

(54) COATING MATERIAL FOR PREVENTION OF METAL CORROSION, AND PROCESS FOR PRODUCING COATING FILM FOR PREVENTION OF METAL CORROSION

(71) Applicant: Sumitomo Chemical Company, Limited, Tokyo (JP)

(72) Inventors: Nobuhiro Oosaki, Osaka (JP); Makiko Miura, Tokyo (JP); Daisuke Shibata, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 56 days.

(21) Appl. No.: 15/754,353

(22) PCT Filed: Aug. 16, 2016

(86) PCT No.: PCT/JP2016/073924
§ 371 (c)(1),
(2) Date: Feb. 22, 2018

(87) PCT Pub. No.: WO2017/038456
PCT Pub. Date: Mar. 9, 2017

(65) Prior Publication Data
US 2018/0244929 A1   Aug. 30, 2018

(30) Foreign Application Priority Data

Aug. 31, 2015 (JP) .................................. 2015-170338

(51) Int. Cl.
*C09D 5/08* (2006.01)
*C09D 5/02* (2006.01)
(Continued)

(52) U.S. Cl.
CPC .................. *C09D 5/08* (2013.01); *C09D 5/02* (2013.01); *C09D 7/40* (2018.01); *C09D 7/63* (2018.01);
(Continued)

(58) Field of Classification Search
CPC .......... C09D 5/08; C09D 129/04; C09D 7/63; C09D 7/40; C09D 5/02; C09D 201/00
See application file for complete search history.

(56) References Cited

U.S. PATENT DOCUMENTS 5,324,437 A * 6/1994 Geke ........................ C09D 7/71
                                                                    210/724
5,700,560 A   12/1997 Kotani et al.
(Continued)

FOREIGN PATENT DOCUMENTS

| CA | 2336512 A1 | 10/2001 |
| CN | 102051100 A | 5/2011 |

(Continued)

OTHER PUBLICATIONS ip.com search (Year: 2019).*
(Continued)

*Primary Examiner* — Pamela H Weiss
(74) *Attorney, Agent, or Firm* — Panitch Schwarze Belisario & Nadel LLP

(57) ABSTRACT

A coating material for preventing metal corrosion contains 50 to 99% by mass of an inorganic layered compound having an average particle size of 10 μm or less; 1 to 50% by mass of a corrosion inhibitor; and a liquid medium, in which the total content of the inorganic layered compound and the corrosion inhibitor is 100% by mass.

7 Claims, 11 Drawing Sheets

(51) Int. Cl.
*C09D 201/00* (2006.01)
*C09D 7/40* (2018.01)
*C09D 7/63* (2018.01)
*C09D 129/04* (2006.01)

(52) U.S. Cl.
CPC ......... *C09D 129/04* (2013.01); *C09D 201/00* (2013.01)

(56) References Cited

U.S. PATENT DOCUMENTS

| | | | | |
|---|---|---|---|---|
| 5,854,326 | A * | 12/1998 | Sakaya | C08K 7/00 524/445 |
| 6,093,298 | A | 7/2000 | Kaylo et al. | |
| 2003/0027011 | A1 * | 2/2003 | Kotov | B05D 7/16 428/594 |
| 2004/0062873 | A1 * | 4/2004 | Jung | C09D 7/67 427/407.1 |
| 2008/0280073 | A1 * | 11/2008 | Yamamoto | B32B 27/08 428/1.54 |
| 2011/0273646 | A1 * | 11/2011 | Fukagawa | C08J 5/18 349/96 |
| 2013/0279001 | A1 * | 10/2013 | Mochizuki | G02B 1/105 359/361 |

FOREIGN PATENT DOCUMENTS

| | | | | | |
|---|---|---|---|---|---|
| EP | | 1152041 | A1 | 11/2001 | |
| EP | | 2607432 | A1 | 6/2013 | |
| JP | | S62-185766 | A | 8/1987 | |
| JP | | 2002-212765 | A | 7/2002 | |
| JP | | 2002-537437 | A | 11/2002 | |
| JP | | 2004-231731 | A | 8/2004 | |
| JP | | 2004-322573 | A | 11/2004 | |
| JP | | 2008-297463 | A | 12/2008 | |
| JP | | 2009-516017 | A | 4/2009 | |
| JP | | 2015014511 | A * | 1/2015 | |
| JP | | 2015-044967 | A | 3/2015 | |
| JP | | 2015-124392 | A | 7/2015 | |
| JP | | 2015-145111 | A | 8/2015 | |
| JP | | 2015145111 | A * | 8/2015 | |
| JP | | H6-093133 | B2 | 3/2017 | |
| WO | | 2005003408 | A2 | 1/2005 | |
| WO | | 2007055498 | A1 | 5/2007 | |
| WO | WO-2007055498 | A1 * | 5/2007 | .......... C08L 2666/54 |
| WO | WO-2013083293 | A1 * | 6/2013 | ............ C09D 5/082 |

OTHER PUBLICATIONS

Extended European Search Report dated Mar. 13, 2019 in EP Application 16841488.6.
Int'l Search Report dated Oct. 18, 2016 in Int'l Application No. PCT/JP/2016/073924.
Int'l Preliminary Report on Patentability and Written Opinion dated Mar. 15, 2018 in Int'l Application No. PCT/JP/2016/073924.
Office Action dated Jun. 13, 2019 in CN Application No. 201680047412.8.
Office Action dated May 12, 2020 in JP Application No. P2017537721.
Office Action dated Feb. 26, 2020 in CN Application No. 201680047412.8.
Office Action dated Jul. 17, 2020 in CN Application No. 201680047412.8.

* cited by examiner

COATING MATERIAL FOR PREVENTION OF METAL CORROSION, AND PROCESS FOR PRODUCING COATING FILM FOR PREVENTION OF METAL CORROSION

CROSS-REFERENCE TO RELATED APPLICATION

This application is a Section 371 of International Application No. PCT/JP2016/073924, filed Aug. 16, 2016, which was published in the Japanese language on Mar. 9, 2017 under International Publication No. WO 2017/038456 A1, and claims priority under 35 U.S.C. § 119(b) to Japanese Application No. 2015-170338, filed Aug. 31, 2015, the disclosures of which are incorporated herein by reference in their entirety.

TECHNICAL FIELD

The present invention relates to a coating material for prevention of metal corrosion and a process for producing a coating film for prevention of metal corrosion.

BACKGROUND ART

Conventionally, metal corrosion has been prevented by forming a film consisting of a corrosion inhibitor on the surface of the metal. For example, Patent Literature 1 discloses a film consisting of a corrosion inhibitor formed on a metal surface by placing a metal product and the corrosion inhibitor in a sealed space and depositing the corrosion inhibitor on the metal surface by volatilizing the corrosion inhibitor, a film consisting of a corrosion inhibitor formed on a metal surface by wrapping a metal product with a resin film containing the corrosion inhibitor and depositing the corrosion inhibitor on the metal surface by volatilizing the corrosion inhibitor contained in the resin film, and a film consisting of a corrosion inhibitor formed on a metal surface by spraying the corrosion inhibitor on the metal surface.

CITATION LIST

Patent Literature

[Patent Literature 1] Japanese Unexamined Patent Publication No. 2015-124392

SUMMARY OF INVENTION

Technical Problem

However, the above-mentioned films consisting of a corrosion inhibitor disclosed in Patent Literature 1 do not have a sufficient metal corrosion prevention performance.

The present invention provides a coating material that can be used to produce a coating film having an excellent metal corrosion prevention performance.

Solution to Problem

The present invention relates to a coating material for prevention of metal corrosion, comprising: 50 to 99% by mass of an inorganic layered compound having an average particle size of 10 μm or less; 1 to 50% by mass of a corrosion inhibitor (wherein the inorganic layered compound and the content of the corrosion inhibitor are each based on a total content of these two of 100% by mass); and a liquid medium.

It is preferable that an aspect ratio of the inorganic layered compound be 20 to 2000.

It is preferable that the coating material for prevention of metal corrosion of the present invention further comprise a resin component.

It is preferable that the resin component be one or more resin components selected from the group consisting of water-soluble resins and water-dispersible resins.

It is preferable that the resin component be a resin component comprising one or more functional groups selected from the group consisting of a hydroxyl group, a carboxyl group, an amino group, a sulfonic acid group, a carboxylate group, a chloro group, a cyano group, and an ammonium group.

Further, the present invention provides a process for producing a coating film for prevention of metal corrosion, the process comprising: a coating step of coating a substrate with the above-mentioned coating material for prevention of metal corrosion; and a drying step of removing the liquid medium from the coating material used for coating in the coating step to obtain a coating film.

In addition, the present invention provides a process for producing a multilayer structure in which a substrate comprising a metal layer and a coating film for prevention of metal corrosion are laminated, the process comprising: a coating step of coating a substrate comprising a metal layer with the above-mentioned coating material for prevention of metal corrosion; and a drying step of removing the liquid medium from the coating material used for coating in the coating step to obtain a coating film.

Still further, the present invention provides a coating film for prevention of metal corrosion, comprising: 50 to 99% by mass of an inorganic layered compound having an average particle size of 10 μm or less; and 1 to 50% by mass of a corrosion inhibitor (wherein the content of the inorganic layered compound and the content of the corrosion inhibitor are each based on a total content of these two of 100% by mass).

Still even further, the present invention provides a multilayer structure in which a substrate comprising a metal layer and the above-mentioned coating film for prevention of metal corrosion are laminated.

It is preferable that the substrate comprising the metal layer be a substrate comprising a metal layer and an anchor coating layer, and that the multilayer structure comprises the anchor coating layer between the metal layer and the coating film for prevention of metal corrosion.

Further, the present invention also provides a use, for prevention of metal corrosion, of a coating material comprising: 50 to 99% by mass of an inorganic layered compound having an average particle size of 10 μm or less; 1 to 50% by mass of a corrosion inhibitor (the content of the inorganic layered compound and the content of the corrosion inhibitor are each based on a total content of these two of 100% by mass); and a liquid medium.

In addition, the present invention also provides a method for preventing metal corrosion, the method comprising: a coating step of coating a substrate comprising a metal layer with the above-mentioned coating material for prevention of metal corrosion; and a drying step of removing the liquid medium from the coating material used for coating in the coating step to obtain a coating film.

Advantageous Effects of Invention

A coating film having excellent metal corrosion prevention performance can be obtained by using the coating material for prevention of metal corrosion of the present invention.

DESCRIPTION OF EMBODIMENTS

Figure 1:
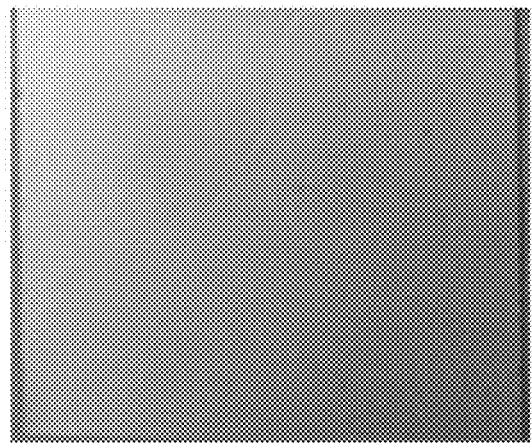
FIG. 1 is a photograph of a multilayer structure (1A) of Example 1 after a salt spray test.

The inorganic layered compound contained in coating material of the present invention is an inorganic compound in which unit crystal layers are stacked on each other to form a layered structure. This layered structure is a structure in which planes where atoms bonding strongly to each other through covalent bonds or the like are arranged densely are stacked approximately parallel to each other by a weak bonding force such as Van der Waals forces. As the inorganic layered compound, a clay mineral having swellability and cleavability in a liquid medium is preferable.

The clay minerals are generally classified into two types, i.e., (i) a type having a two-layer structure, which has a silica tetrahedral layer, and an octahedral layer disposed thereon having aluminum, magnesium, or the like as a central metal; and (ii) a type having a three-layer structure, which has an octahedral layer having aluminum, magnesium, or the like as a central metal and a silica tetrahedral layer disposed on the both sides of the octahedral layer so as to sandwich the octahedral layer. Examples of (i) the two-layer structure type of clay minerals include clay minerals of the kaolinite-serpentine group. Examples of (ii) the three-layer structure type of clay minerals include clay minerals of the talc-pyrophyllite group, smectite group, vermiculite group, mica group, brittle mica group, and chlorite group, which are classified based on the number of interlayer cations.

One or two or more clay minerals may be contained in the coating material for prevention of metal corrosion of the present invention.

Examples of the kaolinite-serpentine group include kaolinite, dickite, nacrite, halloysite, antigorite, chrysotile, lizardite, amesite, berthierine, cronstedtite, nepouite, kellyite, fraipontite, brindleyite, and the like.

Examples of the talc-pyrophyllite group include talc, willemseite, kerolite, pimelite, pyrophyllite, ferri-pyrophyllite, and the like.

Examples of the smectite group include montmorillonite, beidellite, nontronite, saponite, sauconite, stevensite, hectorite, volkonskoite, swinefordite, and the like Examples of the vermiculite group include trioctahedral vermiculite, dioctahedral vermiculite, and the like.

Examples of the mica group include tetrasililic mica, sodium tainiolite, muscovite, phlogopite, biotite, annite, eastonite, siderophyllite tetra-ferri-annite, lepidolite, polylithionite, celadonite, ferroceladonite, ferro-aluminoceladonite, aluminoceladonite, tobelite, paragonite, lepidolite, and the like.

Examples of the brittle mica group include xanthophyllite, clintonite, bityite, anandite, margarite, and the like.

Examples of the chlorite group include clinochlore, chamosite, pennantite, nimite, baileychlore, donbassite, cookeite, sudoite, and the like.

Further, clay minerals whose dispersibility or the like has been improved through treatment, e.g. ion exchange, with an organic substance (see "Dictionary of Clay" published by Asakura Shoten; hereinafter sometimes referred to as organically modified clay mineral) can also be the inorganic layered compound. Examples of the organic substance used here may include publicly known quaternary ammonium salts, such as dimethyldistearyl ammonium salt and trimethylstearyl ammonium salt, phosphonium salts, imidazolium salts, and the like.

Among the above-mentioned clay minerals, clay minerals of the smectite group, vermiculite group and mica group, namely, (ii) three-layer structure type of clay minerals, are preferable. As the smectite group, montmorillonite, beidellite, nontronite, saponite, sauconite, stevensite, and hectorite are preferable.

From the perspectives of transparency and film formability of the coating film, the average particle size of the inorganic layered compound is 10 μm or less. In particular, when the coating film to be obtained by using the coating material for prevention of metal corrosion of the present invention needs to have transparency, it is preferable that the average particle size of the inorganic layered compound be 5 μm or less, more preferable that it be 1 μm or less, and even more preferable that it be 0.8 μm or less. In addition, it is preferable that the average particle size of the inorganic layered compound be 0.02 μm or more. It is noted that the aspect ratio and average particle size of the inorganic layered compound are the values in the inorganic layered compound dispersion liquid including the inorganic layered compound and the liquid medium for swelling and cleaving the inorganic layered compound.

The average particle size L of the inorganic layered compound is the particle size obtained by a diffraction/scattering method carried out in a liquid medium (i.e., the median diameter based on the volume). Specifically, the average particle size can be determined based on Mie scattering theory, by calculating a particle size distribution appropriate for a diffraction/scattering pattern obtained by passing a beam of light through a dispersion liquid of the inorganic layered compound. Specifically, the method for obtaining the average particle size can be carried out by dividing a measuring range of the particle size distribution into suitable sections, determining a representative particle size for each of those sections, and converting those particle size distributions, which are continuous by nature, into discrete quantities.

It is preferable that the aspect ratio of the inorganic layered compound be, from the perspective of the gas barrier properties of the coating film, 20 or more, more preferable that it be 100 or more, and even more preferable that it be 200 or more. In addition, from the perspectives of easier swelling and cleaving, and film formability, it is preferable that the aspect ratio of the inorganic layered compound contained in the coating material of the present invention be 2000 or less, more preferable that it be 1500 or less, even more preferable that it be 1000 or less, and still even more preferable that it be 700 or less.

In the present invention, the aspect ratio (Z) of the inorganic layered compound is defined by the formula: $Z=L/a$, where L indicates the average particle size of the inorganic layered compound and a indicates the unit thickness of the inorganic layered compound, namely, the thickness of the unit crystal layer of the inorganic layered compound, and a is obtained by the powder X-ray diffraction method (see "Guide to Instrumental Analysis (a)" p. 69, Edited by Jiro Shiokawa, published by Kagaku-Dojin Publishing Company, Inc. (1985)).

It is preferable that a swelling value of the inorganic layered compound be, from the perspective of the gas barrier properties of the coating film, 5 or more, and more preferable that it be 20 or more. In addition, it is preferable that a cleavage value of the inorganic layered compound be, from the perspective of the gas barrier properties of the coating film, 5 or more, and more preferable that it be 20 or more.

[Swellability Test]

The swelling value is a value obtained based on the following procedure.

In a 100 ml graduated cylinder, 100 ml of liquid medium is charged, and 2 g of inorganic layered compound is added thereto. After leaving to stand at 23° C. for 24 hours, the volume (ml) of the inorganic layered compound dispersion layer in the graduated cylinder is read from the graduation at the interface between the inorganic layered compound dispersion layer and the supernatant. This value is the swelling value, and the larger the swelling value, the higher the swellability.

[Cleavability Test]

The cleavage value is a value obtained based on the following procedure.

30 g of an inorganic layered compound are added slowly to 1500 ml of a liquid medium, and dispersed by using a disperser at a circumferential velocity of 8.5 m/min, at 23° C. for 90 minutes. Then, 100 ml of the resultant dispersion liquid are collected in a graduated cylinder. After leaving to stand for 60 minutes, the volume (ml) of the inorganic layered compound dispersion layer in the graduated cylinder is read from the graduation at the interface between the inorganic layered compound dispersion layer and the supernatant. This value is the cleavage value, and the larger the cleavage value, the higher the cleavability.

When the inorganic layered compound is a hydrophilic swellable inorganic layered compound, examples of the liquid medium for swelling and cleaving the inorganic layered compound include alcohols, such as methanol, ethanol, propanol, isopropanol, ethylene glycol, and diethylene glycol, water, dimethylformamide, dimethylsulfoxide, acetone, and the like. In particular, water, alcohols and water-alcohol mixtures are preferable. The above-mentioned liquid medium for swelling and cleaving the hydrophilic swellable inorganic layered compound is hereinafter referred to as an aqueous medium.

Further, when the inorganic layered compound is an organic-modified inorganic layered compound, examples of the liquid medium for swelling and cleaving the inorganic layered compound include aromatic hydrocarbons such as benzene, toluene, and xylene, ethers such as ethyl ether and tetrahydrofuran, ketones such as acetone, methyl ethyl ketone, and methyl isobutyl ketone, aliphatic hydrocarbons such as n-pentane, n-hexane, and n-octane, halogenated hydrocarbons such as chlorobenzene, carbon tetrachloride, chloroform, dichloromethane, 1,2-dichloroethane, and perchloroethylene, ethyl acetate, methyl methacrylate, dioctyl phthalate, dimethylformamide, dimethyl sulfoxide, methyl cellosolve, silicone oil, and the like.

Examples of the corrosion inhibitor contained in the coating material for prevention of metal corrosion according to the present invention include azoles, inorganic acids, organic acids, and the like. The inorganic acids and organic acids may each be salts.

Examples of the azoles include imidazole, benzimidazole, 2-mercaptobenzimidazole, benzotriazole, and the like.

Examples of the inorganic acids include boric acid, nitrous acid, phosphonic acid, and the like.

Examples of the organic acids include carboxylic acids, such as aliphatic carboxylic acids, aromatic carboxylic acids, alkenyl succinic acids, sarcosinic acids, alkyl carboxylic acids, and dibasic acids, organic sulfonic acids, organic thiocarboxylic acids, and the like.

Examples of the aliphatic carboxylic acids include: monocarboxylic acids such as caprylic acid, lauric acid, myristic acid, palmitic acid, stearic acid, arachidic acid, behenic acid, linoleic acid, oleic acid, isobutyric acid, 2-methylbutanoic acid, 2-ethylhexanoic acid, trimethylhexanoic acid, isononanoic acid, isoheptanoic acid, isooctylic acid, isodecanoic acid, isotridecanoic acid, isotetradecanoic acid, isostearic acid, acrylic acid, and methacrylic acid; dicarboxylic acids such as oxalic acid, succinic acid, adipic acid, glutaric acid, pimelic acid, azelaic acid, sebacic acid, cyclohexanedicarboxylic acid, maleic acid, fumaric acid, dodecanedioic acid, and dodecadienedioic acid; isobutane tricarboxylic acid; hydroxy carboxylic acids such as lactic acid, hydroxypivalic acid, dimethylolpropionic acid, citric acid, malic acid, glycerin acid, and the like.

Examples of the aromatic carboxylic acids include isopropylbenzoic acid, p-ter-butylbenzoic acid, isooctylbenzoic acid, isononylbenzoic acid, benzoic acid, phthalic acid, isophthalic acid, trimellitic acid, pyromellitic acid, and the like.

Examples of the organic sulfonic acids include petroleum sulfonic acid, alkylbenzene sulfonic acid, dialkyl naphthalene sulfonic acid, and the like. Preferable examples are alkylbenzene sulfonic acid and dialkyl naphthalene sulfonic acid.

Examples of the organic thiocarboxylic acids include 2-benzothiazolylthioacetic acid, 4-methyl-2-benzothiazolylthioacetic acid, 6-amino-2-benzothiazolylthioacetic acid, 3-(2-benzothiazolylthio)-propionic acid, 3-(4-methyl-2-benzothiazolylthio)-propionic acid, 3-(6-amino-2-benzothiazolylthio)-propionic acid, 3-(4,6-dimethyl-2-benzothiazolylthio)-propionic acid, 2-(2-benzothiazolylthio)-propionic acid, 2-(4-methyl-2-benzothiazolylthio)-propionic acid, 5-(2-benzothiazolylthio)-valeric acid, 3-(2-benzothiazolylthio)-valeric acid, 5-(4-methyl-2-benzothiazolylthio)-valeric acid, 3-(2-benzothiazolylthio)-acrylic acid, 3-(4-methyl-2-benzothiazolylthio)-propionic acid, 4-(2-benzothiazolylthio)-butyric acid, 4-(4-methyl-2-benzothiazolylthio)-butyric acid, 4-(6-amino-2-benzothiazolylthio)-butyric acid, 2-(2-benzothiazolylthio)-benzoic acid, 2-(4-methyl-2-benzothiazolylthio)-benzoic acid, and the like.

Examples of the salts of the above-mentioned acids include a salt, a metal salt, a metal hydroxide salt, a metal carbonate salt, an ammonium salt, and the like of the acid and an amine compound.

Examples of the metal salt of the acid include an alkali metal salt, an alkali earth metal salt, a rare earth metal salt, and the like of the acid. An alkali metal salt of the acid or an alkali earth metal salt of the acid is preferable.

Examples of the amine compound include alkanolamines such as monoethanolamine, diethanolamine, triethanolamine, monoisopropanolamine, diisopropanolamine, and triisopropanolamine; aliphatic amines such as methylamine, ethylamine, n-propylamine, isopropylamine, n-butylamine, isobutylamine, dimethylamine, diethylamine, di-n-propylamine, diisopropylamine, dibutylamine, trimethylamine, triethylamine, tripropylamine, and tributylamine; aromatic amines such as aniline, methylaniline, ethylaniline, dodecylaniline, methylbenzylamine, alkyldiphenylamine, and alkylnaphthylamine; aliphatic polyamines such as triethylenetetramine and hexamethylenediamine; cyclic amines, and the like. Among these, from the perspective of better metal corrosion prevention performance, alkanolamines or aliphatic amines are preferable, and alkanolamines are more preferable.

From the perspective of better metal corrosion prevention performance, it is preferable that the salt of the organic acid be a salt of an organic acid and an amine compound (hereinafter, referred to as an organic acid amine salt). Among organic acid amine salts, more preferable are salts of carboxylic acids (particularly preferably aliphatic carboxylic acids) or organic sulfonic acids with alkanolamines or aliphatic amines (particularly preferably alkanolamines).

Only one of the corrosion inhibitor may be used alone, or two or more of the corrosion inhibitors may be used together. It is preferable that the corrosion inhibitor contained in the coating material for prevention of metal corrosion of the present invention be a volatile corrosion inhibitor or a water-soluble corrosion inhibitor.

The content of the inorganic layered compound contained in the coating material for prevention of metal corrosion of the present invention is 50 to 99% by mass, and the content of the corrosion inhibitor is 1 to 50% by mass (wherein the content of the inorganic layered compound and the content of the corrosion inhibitor are each based on a total content of these two of 100% by mass). It is preferable that the content of the inorganic layered compound be 60% by mass or more, more preferable that it be 70% by mass or more, and even more preferable that it be 80% by mass or more. It is preferable that the content of the corrosion inhibitor be 40% by mass or less, more preferable that it be 30% by mass or less, and even more preferable that it be 20% by mass or less.

Examples of the liquid medium contained in the coating material for prevention of metal corrosion of the present invention include water, dimethylformamide, dimethyl sulfoxide, alcohols, aromatic hydrocarbons, aliphatic hydrocarbons, ethers, ketones, halogenated hydrocarbons, ethyl acetate, methyl methacrylate, dioctyl phthalate, methyl cellosolve, silicone oil, and the like.

Examples of alcohols include methanol, ethanol, propanol, isopropanol, butanol, ethylene glycol, diethylene glycol, and the like.

Examples of aromatic hydrocarbons include benzene, toluene, xylene, and the like.

Examples of aliphatic hydrocarbons include n-pentane, n-hexane, n-octane, and the like.

Examples of ethers include ethyl ether, tetrahydrofuran, and the like.

Examples of ketones include acetone, methyl ethyl ketone, methyl isobutyl ketone, and the like.

Examples of halogenated hydrocarbons include chlorobenzene, carbon tetrachloride, chloroform, dichloromethane, 1,2-dichloroethane, perchloroethylene, and the like.

These liquid mediums may each be used alone or two or more thereof may be used together. In the present invention, liquid medium refers to a medium that is a liquid at 23° C.

The coating material for prevention of metal corrosion of the present invention may further comprise a resin component. The resin component may be one resin, or two or more resins. It is preferable that the resin component comprises one or more resins selected from the group consisting of water-soluble resins and water-dispersible resins. The resin component selected from the group consisting of water-soluble resins and water-dispersible resins refers to a resin component that when 1 g of resin component is added to 1000 g of any one of liquid media α as defined below, and the resultant mixture is stirred for 90 minutes at a circumferential velocity of 8.5 m/min at 95° C. using a disperser, does not leave any undissolved residue or form a sediment based on a visual evaluation. If a resin meets the above-mentioned condition when at least any one of the below-described liquid media α is used, then that resin is considered to be the resin component selected from the group consisting of water-soluble resins and water-dispersible resin. When the resin component comprises two or more resins, it is preferable for each resin to meet the above-mentioned condition.

Here, the liquid medium α is a liquid medium comprising 0 to 50% by mass of one or more liquid media selected from the group consisting of alcohol, dimethylformamide, dimethylsulfoxide, and acetone, and 50 to 100% by mass of water.

Examples of the resin component selected from the group consisting of water-soluble resins and water-dispersible resins include resin components comprising one or more functional groups selected from the group consisting of a hydroxyl group, a carboxyl group, an amino group, a sulfonic acid group, a carboxylate group, a chloro group, a cyano group, and an ammonium group.

Examples of resin components comprising one or more functional groups selected from the group consisting of a hydroxyl group, a carboxyl group, an amino group, a sulfonic acid group, a carboxylate group, a chloro group, a cyano group, and an ammonium group include a polyvinyl alcohol, an ethylene-vinyl alcohol copolymer, polyvinylidene chloride, polyacrylonitrile, polysaccharides, polyacrylic acid and esters thereof, and urethane resins.

It is preferable that the resin component be a resin component comprising two or more functional groups selected from the group consisting of a hydroxyl group, a carboxyl group, an amino group, a sulfonic acid group, a carboxylate group, a chloro group, a cyano group, and an ammonium group.

The resin component comprising two or more functional groups may be a resin component comprising two or more functional groups in one molecule, or may be a mixture of a resin component comprising a first functional group and a resin component comprising a second functional group.

It is preferable that the functional groups contained in the resin component comprising two or more functional groups form a covalent bond or an ionic bond.

When the resin component contained in the coating material for prevention of metal corrosion is a resin component comprising two or more functional groups in one molecule, the resin component may be a vinyl alcohol-acrylic acid copolymer, a vinyl alcohol-methacrylic acid copolymer, a vinyl alcohol-vinylamine copolymer, an acrylic acid-vinylamine copolymer, and a methacrylic acid-vinylamine copolymer.

When the resin component contained in the coating material for prevention of metal corrosion is a mixture of a resin component comprising a first functional group and a resin component comprising a second functional group, the resin component contained in the coating material may be a combination of two or more resin components selected from the group consisting of polyvinyl alcohol, polyacrylic acid, polymethacrylic acid, and polyvinylamine. Here, the resin component comprising a first functional group and the resin component comprising a second functional group may be an oligomer component.

From the perspectives of easily dissolving in an aqueous medium, ease of handling, and the water resistance, gas barrier properties, and scratch resistance of the coating film, it is preferable that the resin component contained in the coating material for prevention of metal corrosion be a resin component comprising a hydroxyl group and a carboxyl group. It is noted that "hydroxyl group" does not encompass "—OH" in a carboxyl group.

The resin component comprising a hydroxyl group and a carboxyl group may be a resin component comprising a hydroxyl group and a carboxyl group in one molecule. Examples of the resin component comprising a hydroxyl group and a carboxyl group in one molecule include a vinyl alcohol-acrylic acid copolymer, a vinyl alcohol-methacrylic acid copolymer, and the like.

The resin component comprising a hydroxyl group and a carboxyl group may be a resin component containing a resin component comprising a hydroxyl group and a resin component comprising a carboxyl group.

Examples of the resin component comprising a hydroxyl group include a polyvinyl alcohol, an ethylene-vinyl alcohol copolymer, and polysaccharides.

The polyvinyl alcohol is a polymer containing monomer units derived from a vinyl alcohol as a main component. The polyvinyl alcohol can be obtained by hydrolyzing a vinyl polycarboxylate, such as polyvinyl acetate, polyvinyl trifluoroacetate, polyvinyl formate, and polyvinyl pivalate, or hydrolyzing a polyvinyl ether, such as poly-tert-butyl vinyl ether, and poly(trimethylsilyl vinyl ether) (regarding the details of the polyvinyl alcohol, for example, "The World of PVA" edited by POVAL Committee (1992), published by Polymer Publishing Association, and a book titled "POVAL" written by Nagano et al. (1981), published by Polymer Publishing Association, may be referred to).

From the perspective of the gas barrier properties of the coating film, it is preferable that the degree of saponification of the polyvinyl alcohol be 70 mol % or more, more preferable that it be 85 mol % or more, and even more preferable that it be 98 mol % or more.

The degree of saponification can be obtained based on the following equation.

Degree of saponification(mol %)={(the number of hydroxyl groups in the polyvinyl alcohol)/(total of the number of moieties having an ester bond or number of moieties having an ether bond remaining in the polyvinyl alcohol and the number of hydroxyl groups)}×100 (Equation)

From the perspective of film formability when obtaining a coating film using the coating material for prevention of metal corrosion, it is preferable that the degree of polymerization of the polyvinyl alcohol be 100 or more and 5000 or less, and more preferable that it be 200 or more and 3000 or less.

The ethylene-vinyl alcohol copolymer is a polymer having monomer units derived from ethylene and monomer units derived from a vinyl alcohol.

Further, a polyvinyl alcohol derivative additionally having functional groups other than a hydroxyl group and a carboxyl group can also be used. Examples of such functional groups other than a hydroxyl group and a carboxyl group include an amino group, a thiol group, a sulfonic acid group, a phosphoric acid group, a carboxylate group, a sulfonic acid ion group, a phosphoric acid ion group, an ammonium group, a phosphonium group, a silyl group, a siloxy group, an allyl group, a fluoroalkyl group, an alkoxy group, a carbonyl group, and a halogen group. Some hydroxyl groups in the polyvinyl alcohol may be replaced by one or two or more of the functional groups.

Polysaccharides are biopolymers which are synthesized by polycondensation of various monosaccharides in a biological system, and chemically modified products of such biopolymers are also included. Examples thereof include cellulose, cellulose derivatives such as hydroxymethylcellulose, hydroxyethylcellulose and carboxymethylcellulose; and amylose, amylopectin, pullulan, curdlan, xanthan, chitin, chitosan, and the like.

Examples of the resin component having a carboxyl group include polyacrylic acid, polymethacrylic acid, partially neutralized polyacrylic acid, partially neutralized polymethacrylic acid, and acrylic acid-methacrylic acid copolymer. These may be used singly, or two or more thereof may be used together. From the perspectives of film formability and scratch resistance of the coating film, it is preferable that the weight average molecular weight of the resin component containing a carboxyl group be 2000 or more and 10000000 or less, and more preferable that it be 5000 or more and 10000000 or less.

The partially neutralized polyacrylic acid or the partially neutralized polymethacrylic acid can be obtained by adding an alkali metal ion donating compound, which is described below, to an aqueous solution of polyacrylic acid or polymethacrylic acid to neutralize the polyacrylic acid or polymethacrylic acid, and thereby convert some of the carboxyl groups into their alkali metal salt. A desired degree of neutralization can be achieved by controlling the ratio of the amount of substance of the polyacrylic acid or polymethacrylic acid to the alkali metal ion donating compound. The degree of neutralization is calculated by the following equation.

Degree of neutralization=$(A/B) \times 100$

A: Number of moles of carboxyl groups having been neutralized into a metal salt in 1 g of a partially neutralized polyacrylic acid or a partially neutralized polymethacrylic acid B: Total number of moles of carboxyl groups and carboxyl groups having been neutralized into a metal salt in 1 g of a partially neutralized polyacrylic acid or a partially neutralized polymethacrylic acid The partially neutralized polyacrylic acid or the partially neutralized polymethacrylic acid can also be obtained by bringing an aqueous solution of a completely neutralized polyacrylic acid or a completely neutralized polymethacrylic acid into contact with a hydrogen ion type ion-exchange resin. An example of the contact method is to mix an aqueous solution of a completely neutralized polyacrylic acid or a completely neutralized polymethacrylic acid with a hydrogen ion type ion-exchange resin, stir the resultant mixture, and then remove the residue of the hydrogen ion type ion-exchange resin. In this method, a desired degree of neutralization can be obtained by adjusting the amount ratio of the completely neutralized polyacrylic acid or the completely neutralized polymethacrylic acid to the hydrogen ion type ion-exchange resin, the aqueous solution temperature, and the stirring time. Another example is to pass an aqueous solution of the completely neutralized polyacrylic acid or the completely neutralized polymethacrylic acid through a column in which a hydrogen ion type ion-exchange resin is packed. In this method, a desired degree of neutralization can be obtained by adjusting the column length, the flow-through rate, and the aqueous solution temperature. The degree of neutralization is calculated by the following equation.

$$\text{Degree of neutralization} = (C/D) \times 100$$

C: Number of moles of carboxyl groups present in the form of a metal salt in 1 g of a partially neutralized polyacrylic acid or a partially neutralized polymethacrylic acid
D: Total number of moles of carboxyl groups formed via ion exchange and carboxyl groups present in the form of a metal salt in 1 g of a partially neutralized polyacrylic acid or a partially neutralized polymethacrylic acid From the perspective of the water resistance and the transparency of the coating film, it is preferable that the degree of neutralization of the partially neutralized polyacrylic acid and the partially neutralized polymethacrylic acid be 0.1% or more and 20% or less.

The amount of substance of the hydroxyl group in the resin component comprising a hydroxyl group and a carboxyl group is 30 mol % or more and 95 mol % or less, and preferably 70 mol % or more and 95 mol % or less. The amount of substance of the carboxyl group in the resin component comprising a hydroxyl group and a carboxyl group is 5 mol % or more and 70 mol % or less, and preferably 5 mol % or more and 30 mol % or less. However, the total of the amount of substance of the hydroxyl group and the amount of substance of the carboxyl group contained in the resin component comprising a hydroxyl group and a carboxyl group is 100 mol %.

The amount of substance of the hydroxyl group and the amount of substance of the carboxyl group in the resin component comprising a hydroxyl group and a carboxyl group can be obtained by a publicly known NMR method, IR method, or the like. In, for example, the IR method, the amount of substance can be calculated from a calibration curve obtained using samples having a known molar ratio of hydroxyl groups to carboxyl groups. When the resin component comprising a hydroxyl group and a carboxyl group is a mixture of a vinyl alcohol homopolymer having a degree of saponification of 98 mol % or more and an acrylic acid homopolymer and/or a methacrylic acid homopolymer, the amount of substance of the hydroxyl group and the amount of substance of the carboxyl group can be calculated from the masses of the respective homopolymers.

From the perspective of the water resistance, gas barrier properties, and scratch resistance of the coating film, it is preferable that the total of the mass of the hydroxyl groups and the mass of the carboxyl groups in the resin component comprising a hydroxyl group and a carboxyl group be 30% by mass or more and 60% by mass or less, and more preferable that it be 35% by mass or more and 55% by mass or less, when the resin component comprising a hydroxyl group and a carboxyl group is 100% by mass. The carboxyl group encompasses the above-mentioned carboxyl groups that have been neutralized and turned into a metal salt.

The total of the mass of the hydroxyl groups and the mass of the carboxyl groups contained in the resin component comprising a hydroxyl group and a carboxyl group can also be obtained by the publicly known NMR method, IR method, or the like. In, for example, the IR method, the total can be calculated from a calibration curve obtained using a polyol polymer having a known number of polyol units and a polycarboxylic acid polymer having a known number of polycarboxylic acid units. In the case of using a vinyl alcohol homopolymer having a degree of saponification of 98 mol % or more and an acrylic acid homopolymer and/or a methacrylic acid homopolymer, the mass of the hydroxyl groups and the mass of the carboxyl groups are each obtained from the masses of the respective homopolymers, and the sum of these masses can be used as the total.

When the resin component contained in the coating material for prevention of metal corrosion is a resin component comprising a hydroxyl group and a carboxyl group, from the perspective of the water resistance, gas barrier properties, and scratch resistance of the obtained coating film, it is preferable that the coating material for prevention of metal corrosion comprises an ammonium ion, an alkali metal ion, or an alkali earth metal ion.

Examples of the alkali metal ion include a sodium ion, a lithium ion, a potassium ion, and the like.

Examples of the alkali earth metal ion include a calcium ion, a magnesium ion, and the like.

When the coating material for prevention of metal corrosion comprising a resin component and an inorganic layered compound comprises an ammonium ion, an alkali metal ion, or an alkali earth metal ion, it is preferable that the content of the ammonium ion, alkali metal ion, or alkali earth metal ion be 0.2 parts by mass or more and 5 parts by mass or less, and more preferable that it be 0.2 parts by mass or more and 2 parts by mass or less, when the content of the resin component contained in the coating material for prevention of metal corrosion comprising a resin component and an inorganic layered compound is 100 parts by mass.

The alkali metal ion derives from an alkali metal ion donating compound, the ammonium ion derives from an ammonium ion donating compound, and the alkali earth metal ion derives from an alkali earth metal ion donating compound. When the resin component included in the coating material for prevention of metal corrosion of the present invention is a resin component comprising a hydroxyl group and a carboxyl group, it is preferable that the coating material and/or the coating film obtained by using that coating material comprise an ammonium ion donating compound, an alkali metal ion donating compound, or an alkali earth metal ion donating compound.

Examples of the ammonium ion donating compound include ammonium hydroxide, ammonium chloride, and the like Examples of the alkali metal ion donating compound include sodium hydroxide, sodium hypophosphite, lithium hydroxide, potassium hydroxide, and the like.

Examples of the alkaline earth metal ion donating compound include calcium hydroxide, calcium chloride, magnesium hydroxide, magnesium chloride, and the like.

Further, the corrosion inhibitor contained in the coating material for prevention of metal corrosion may be alkali metal ion donating compound or an alkali earth metal ion donating compound.

These may be used singly, or two or more thereof may be used together.

Montmorillonite, which is one inorganic layered compound, contains sodium ions between the layers of the montmorillonite, and hence acts as an alkali metal ion donating compound. Therefore, when the resin component contained in the coating material for prevention of metal corrosion is a resin component comprising a hydroxyl group and a carboxyl group, it is preferable that the inorganic layered compound contained in the coating material be montmorillonite.

The coating material for prevention of metal corrosion can further comprise a plasticizer. When the coating material for prevention of metal corrosion comprises a plasticizer, a coating film having excellent stretchability during thermoforming can be obtained. The plasticizer is a hydroxy acid or a compound in which at least one hydroxyl group is bonded to each of two or more consecutive carbon atoms in the molecule (hereinafter, referred to as compound I).

Examples of the hydroxy acid include aliphatic hydroxy acids such as lactic acid, glycolic acid, malic acid and citric acid, and aromatic hydroxy acids such as salicylic acid and coumaric acid.

Examples of the compound 1 include polymers of polyhydric alcohols such as polysorbitol, polymannitol, polydulcitol, polyxylitol, polyerythritol, polyglycerin, and the like. The molecular weight of the compound I is 200 or more and 4000 or less, and from the perspectives of solubility in water and stretchability during thermoforming, it is preferable that it be 350 or more and 3000 or less, and more preferable that it be 500 or more and 2500 or less.

A part of the plasticizer may be esterified, and two or more plasticizers may be used together.

From the perspectives of solubility in an aqueous medium and stretchability during thermoforming, it is preferable that the plasticizer be polyglycerin or lactic acid.

When the coating material for prevention of metal corrosion of the present invention comprises a resin component, based on a total amount of the resin component and the inorganic layered compound of 100% by mass, it is preferable that the content of the resin component be 50% by mass or more, more preferable that it be 60% by mass or more, even more preferable that it be 70% by mass or more, and most preferable that it be 80% by mass or more. It is preferable that the content of the inorganic layered compound be 50% by mass or less, more preferable that it be 40% by mass or less, even more preferable that it be 30% by mass or less, and most preferable that it be 20% by mass or less.

The coating material for prevention of metal corrosion of the present invention may comprise publicly known additives, for example, an antioxidant, a UV absorber, a light stabilizer, an anti-blocking agent, and a colorant, according to the purpose and the application. These additives may be used singly, or two or more thereof may be used together. In particular, by comprising fine particles of an inorganic oxide, such as silica, alumina, and zirconia, the adhesive properties between the substrate and the coating film obtained by using the coating material for prevention of metal corrosion of the present invention and the adhesive properties between the coating film and the below-described resin layer are good. It is preferable that the average particle size of those fine particles be, from the perspective of the adhesive properties, 0.1 µm or more and 10 µm or less, and more preferable that it be 0.5 µm or more and 5 µm or less. It is preferable that the content of the fine particles be, when the volume of the inorganic layered compound and the corrosion inhibitor contained in the coating material for prevention of metal corrosion is 100 parts by mass, from the perspective of the adhesive properties, 5 parts by mass or less, and more preferable that it be 3 parts by mass or less.

Further, the coating material for prevention of metal corrosion of the present invention may comprise a below-described anchor coating agent for improving adhesion between the substrate and the coating film. In particular, when the coating material comprises a resin component comprising a hydroxyl group and a carboxyl group, a coating film having excellent adhesion and water resistance can be obtained by further comprising a silane coupling agent, a metal alkoxide, a metal chelate, a carbodiimide, and the like.

Examples of the method for preparing the coating material for prevention of metal corrosion of the present invention include: dissolving or dispersing each of the inorganic layered compound and the corrosion inhibitor in separate liquid media to prepare two solutions, and then mixing those two solutions; dissolving or dispersing the inorganic layered compound and the corrosion inhibitor in one liquid medium, and the like.

When the coating material for prevention of metal corrosion of the present invention comprises a resin component, examples of the method for preparing the coating material include: dissolving or dispersing each of the inorganic layered compound, the corrosion inhibitor, and the resin component in separate liquid media to prepare three solutions, and then mixing those three solutions; dissolving or dispersing the inorganic layered compound, the corrosion inhibitor, and the resin component in one liquid medium, and the like.

When producing the coating material for prevention of metal corrosion of the present invention, it is preferable to disperse the inorganic layered compound in the liquid medium by a high-pressure dispersion treatment in order to swell and cleave the inorganic layered compound in the coating material fully in the medium. The high-pressure dispersion treatment is a treatment method in which a mixed solution obtained by mixing the inorganic layered compound into the liquid medium is forced to pass through one or a plurality of capillary tubes at high speed. The flows of the mixed solution passed through the capillary tube(s) may be combined, thereby causing the flows to collide with each other or against the inner walls of the capillary tubes to impart high shear and/or high pressure on the mixed solution. In the high-pressure dispersion treatment, it is preferable for a maximum pressure of 100 kgf/cm$^2$ or more to be applied when passing the mixed solution through capillary tubes with a diameter of 1 µm or more and 1000 µm or less. It is more preferable that the maximum pressure be 500 kgf/cm$^2$ or more, and particularly preferable that it be 1000 kgf/cm$^2$ or more. When passing the mixed solution through the above-mentioned capillary tubes, it is preferable that the maximum speed of arrival of the dispersion liquid be 100 m/s or more, and it is preferable that the rate of heat transfer due to pressure loss be 100 kcal/hour or more. The high-pressure dispersion treatment can be conducted using a high-pressure dispersion apparatus, such as an ultrahigh pressure homogenizer manufactured by Microfluidics Corporation (trade name: Microfluidizer), a nanomizer manufactured by Nanomizer Inc., a Manton-Gaulin type high-pressure dispersion apparatus, and a homogenizer manufactured by Izumi Food Machinery Co., Ltd.

The corrosion inhibitor or the resin component may be contained in the mixed solution to be subjected to the high-pressure dispersion treatment.

The coating material for prevention of metal corrosion of the present invention may comprise a surfactant. By using a coating material for prevention of metal corrosion that contains a surfactant to obtain the coating film, the adhesive properties between that coating film and the substrate can be improved. The content of the surfactant is generally 0.001 parts by mass or more and 5 parts by mass or less, based on 100 parts by mass of the coating material for prevention of metal corrosion.

As the surfactant, from the perspective of the adhesive properties, it is preferable to use an alkali metal salt of a carboxylic acid with an alkyl chain having from 6 to 24 carbon atoms, an ether type nonionic surfactant (silicone-based nonionic surfactant) such as polyoxyethylene octylphenyl ether and polydimethylsiloxane-polyoxyethylene copolymer, or a fluorine type nonionic surfactant such as a perfluoroalkyl ethylene oxide compound.

When coating the coating material for prevention of metal corrosion of the present invention on a substrate comprising a metal layer, the pH of the coating material for prevention of metal corrosion can be appropriately adjusted in accordance with the kind of metal of the metal layer, for example when the metal layer includes iron, set to a pH of 7 or higher. Examples of the method for adjusting the pH include using an ion-exchange resin, adding an acidic substance or an alkaline substance, and the like.

Using the coating material for prevention of metal corrosion of the present invention, a coating film for prevention of metal corrosion comprising 50 to 99% by mass of an inorganic layered compound having a particle size of 10 m or less and 1 to 50% by mass of a corrosion inhibitor (wherein the content of the inorganic layered compound and the content of the corrosion inhibitor included in the coating film are each based on a total content of these two of 100% by mass) can be produced.

When the coating material for prevention of metal corrosion of the present invention comprises an inorganic layered compound having a particle size of 10 µm or less, an corrosion inhibitor, and a resin component, a coating film for prevention of metal corrosion comprising 50 to 99% by mass of the inorganic layered compound having a particle size of 10 µm or less, 1 to 50% by mass of the corrosion inhibitor (wherein the content of the inorganic layered compound and the content of the corrosion inhibitor are each based on a total content of these two of 100% by mass), and the resin component can be produced. When the coating material for prevention of metal corrosion comprises a resin component, based on a total amount of the resin component and the inorganic layered compound included in the coating film of 100% by mass, it is preferable that the content of the resin component be 50% by mass or more, more preferable that it be 60% by mass or more, even more preferable that it be 70% by mass or more, and most preferable that it be 80% by mass or more. It is preferable that the content of the inorganic layered compound be 50% by mass or less, more preferable that it be 40% by mass or less, even more preferable that it be 30% by mass or less, and most preferable that it be 20% by mass or less.

An example of the process for producing a coating film for prevention of metal corrosion includes a production process comprising a coating step of coating a substrate with the coating material for prevention of metal corrosion of the present invention, and a drying step of removing the liquid medium from the coating material used for coating in the coating step to obtain a coating film.

[Substrate]

Examples of the material constituting the substrate to be coated with the coating material for prevention of metal corrosion of the present invention include metals, resins, wood, ceramics, glass, and the like. The substrate may be a single layer, or may be multilayer. The shape of the substrate may be film-like, sheet-like, or plate-like. The substrate may also be a cloth woven from non-woven fabric or metal thread, or a molded product.

When the substrate comprises a metal layer, based on the production process comprising a coating step of coating the substrate with the coating material for prevention of metal corrosion of the present invention, and a drying step of removing the liquid medium from the coating material used for coating in the coating step to obtain a coating film, a multilayer structure A comprising a substrate and a coating film containing the inorganic layered compound and the corrosion inhibitor is produced. Corrosion of the metal layer in the multilayer structure A is prevented by the coating film.

When the substrate does not comprise a metal layer, based on the production process comprising a coating step of coating the substrate with the coating material for prevention of metal corrosion of the present invention, and a drying step of removing the liquid medium from the coating material used for coating in the coating step to obtain a coating film, a multilayer structure B comprising a substrate and a coating film containing the inorganic layered compound and the corrosion inhibitor is produced. The coating film can be peeled from the multilayer structure B, and laminated on a metal plate to prevent corrosion of the metal plate. Further, corrosion of the metal plate can also be prevented by laminating the multilayer structure B on the metal plate.

Examples of metals for which corrosion can be prevented by the coating material for prevention of metal corrosion of the present invention include steels and non-ferrous metals.

Examples of steels include alloy steels such as carbon steel, cast iron, chromium steel, nickel steel, stainless steel, high speed steel, tool steel, and the like.

Examples of nonferrous metals include noble metals such as gold, silver, copper, platinum, and palladium, low melting point metals such as tin, lead and bismuth, aluminum, nickel, and the like. Further examples include alkali metals such as sodium, lithium, and potassium, alkaline earth metals such as magnesium, calcium, zinc, beryllium, and cadmium, titanium, cobalt, zirconium, chromium, molybdenum, tungsten, and the like. Still more examples include alloys of these steels and nonferrous metals or alloys of nonferrous metals. In the present invention, ceramics such as alumina, silica, zirconia, titanium oxide, and the like are considered to be metals.

The method for forming the metal layer include forging, pressing, powder metallurgy, casting, sputtering, vapor deposition processing, cutting out, plating, and the like.

Examples of ceramics constituting the substrate include alumina, silica, zirconia, titanium oxide, and the like.

Examples of the resin constituting the substrate include thermoplastic resins, thermosetting resins, photosetting resins, and the like.

[Anchor Coating Layer]

An anchor coating layer may be provided as the resin layer constituting the substrate. The substrate of the multilayer structure A may be a substrate comprising a metal layer and an anchor coating layer.

Examples of anchor coating agents for forming the anchor coating layer include urethane anchor coating agents, silicone anchor coating agents, silane anchor coating agents, ester resin anchor coating agents, one-part curable epoxy anchor coating agents, acrylic anchor coating agents, olefin resin anchor coating agents, fluororesin anchor coating agents, rubber anchor coating agents, starch anchor coating agents, urea resin anchor coating agents, melamine resin anchor coating agents, phenol resin anchor coating agents, polyaromatic anchor coating agents, polysulfide anchor coating agents, and the like.

Urethane anchor coating agents are anchor coating agents having a urethane bond, and can be classified into one-part curable urethane anchor coating agents and two-part curable urethane anchor coating agents.

One-part curable urethane anchor coating agents, which are anchor coating agents that are cured by adding moisture, heat, and the like, can be classified into moisture curable anchor coating agents, blocking anchor coating agents, and lacquer anchor coating agents.

Moisture curable anchor coating agents are pre-polymers having an isocyanate group on an end, and are cured by reacting with moisture in the air.

Blocking anchor coating agents are formed as one-part anchor coating agents by mixing in advance a polyol component containing active hydrogens as a main component and a component in which the isocyanate groups in a polyisocyanate are masked with a blocking agent. When heated to a temperature at which the blocking agent dissociates (generally, 140° C. to 200° C.), active isocyanate groups are regenerated, and those regenerated active isocyanate groups react with the polyol component to form a tough anchor coating layer.

Lacquer anchor coating agents are a high molecular weight polyurethane solution, which can obtain an anchor coating layer just by volatilizing the solvent.

Two-part curable urethane anchor coating agents are anchor coating agents comprising a compound having an isocyanate group and an active hydrogen compound, which are cured by mixing a liquid containing the compound having an isocyanate group and a liquid containing the active hydrogen compound.

Examples of the compound having an isocyanate group include tolylene diisocyanate, 4,4'-diphenylmethane diisocyanate, xylylene diisocyanate, hexamethylene diisocyanate, 4,4'-methylenebiscyclohexyl isocyanate, isophorone diisocyanate, and the like. The active hydrogen compound is a compound having two or more hydroxyl groups, which are active hydrogen groups, and does not have a carboxyl group, in one molecule. Examples thereof include low molecular weight polyols such as ethylene glycol, diethylene glycol, dipropylene glycol, 1,4-butanediol, 1,6-hexanediol, neopentyl glycol and trimethylolpropane; polyether polyols such as polyethylene glycol, polyoxypropylene glycol, ethylene oxide/propylene oxide copolymers, and polytetramethylene ether glycol; polyesters produced by reacting two monomers, such as a diol and a dibasic acid; polyester polyols such as poly-β-methyl-5-valerolactone, polycaprolactone, and the like.

It is preferable that the active hydrogen compound has a number average molecular weight of 300 or more and 100000 or less.

It is preferable that the mixing ratio of the isocyanate compound and the active hydrogen compound in the two-part curable urethane anchor coating agents to be determined based on the molar ratio of the isocyanate groups to the hydroxyl groups included in the active hydrogen compound (active hydrogen groups). When the number of moles of isocyanate groups is represented as AN, and the number of moles of active hydrogen groups of the active hydrogen compound is represented as BN, it is preferable that a ratio R (R=AN/BN) of the number of moles of isocyanate groups to the number of moles of the active hydrogen groups be, from the perspective of the adhesive properties between the anchor coating layer and the coating film, 0.001 or more, and from the perspective of blocking prevention, it is preferable that it be 1000 or less. Each of the number of moles of isocyanate groups and the number of moles of active hydrogen groups can be determined by $^1$H-NMR and $^{13}$C-NMR. Specifically, the number of moles of isocyanate groups can be calculated from a calibration curve obtained using a sample having a known number of moles of isocyanate groups. Further, the number of moles of active hydrogen groups can be calculated from a calibration curve obtained using a sample having a known number of moles of active hydrogen groups.

The two-part curable urethane anchor coating agents are preferably a two-part curable urethane anchor coating agent having a carbonate skeleton in the main chain. A two-part curable urethane anchor coating agent having a carbonate skeleton in the main chain is an anchor coating agent containing a compound having an isocyanate group and an active hydrogen compound, and is cured by mixing a liquid containing the compound having an isocyanate group and a liquid containing the active hydrogen compound having a carbonate skeleton. The carbonate skeleton may be a cyclic carbonate skeleton.

Silicone anchor coating agents are anchor coating agents containing an organopolysiloxane as a main component, and are classified into condensation-curable anchor coating agents and addition-curable anchor coating agents.

Condensation-curable anchor coating agents are a mixture of an organopolysiloxane having a hydroxyl group or an epoxy group at the end and a crosslinking agent, and are cured by reacting with moisture in the air. The condensation-curable anchor coating agents may contain, in place of the above-mentioned organopolysiloxane, an oxysilane compound such as alkyloxysilane.

Addition-reactive anchor coating agents are two-part anchor coating agents containing polyorganosiloxane having a vinyl group at the end and a crosslinking agent, and are cured by adding a catalyst and heating. The addition-curable anchor coating agents may also be, for example, a polypropylene oxide having a methyl dimethoxysilyl group at the end.

The silane anchor coating agent is a compound having an organic reactive group and a silane alkoxide unit which is hydrolyzed to produce a silanol group. Examples of the organic reactive group include an amino group, an epoxy group, a vinyl group, a mercapto group, an isocyanate group, and the like. Examples of the silane alkoxide unit include methoxysilane, ethoxysilane, and the like.

The ester resin anchor coating agent is a compound having a hydroxyl group and/or a carboxyl group in a side chain of a resin having an ester bond in the main chain such as polyethylene terephthalate, polybutylene terephthalate, polyethylene naphthalate, and the like.

The one-part curable epoxy anchor coating agent is a coating agent obtained by mixing in advance an epoxy compound, an amine masked with a blocking agent, and a carboxylic acid masked with a blocking agent to form a one-part coating agent. When heated to a temperature at which the blocking agent dissociates (generally about 140° C. to 200° C.), active amine and active carboxylic acid are regenerated and react with the epoxy compound to form a tough coating film.

The acrylic anchor coating agent is an anchor coating agent containing an acrylic monomer such as acrylic acid or an acrylic acid derivative as a main component. Many acrylic anchor coating agents contain an elastomer, a catalyst, and the like in addition to the acrylic monomer. The acrylic anchor coating agent may be an acrylic styrene material. There are anchor coating agents that are cured without undergoing a chemical reaction, as well as anchor coating agents that are cured by a polymerization reaction that can be used as the above-mentioned anchor coating agent. Anchor coating agents that are cured by a polymerization reaction are used by, for example, mixing with a curing agent such as an organic peroxide.

The olefin resin anchor coating agent is an anchor coating agent containing an olefin resin as a main component, and may contain a metal oxide such as calcium hydroxide. Examples of the olefin resin include an olefin homopolymer or an olefin copolymer obtained by polymerizing two or more olefins. As such olefins, olefins having 2 to 20 carbon atoms are particularly preferable, and examples thereof include ethylene, propylene, 1-butene, 1-pentene, 1-hexene, 1-heptene, 1-octene, 1-nonene, 1-decene, 1-dodecene, 1-dodecadecene, 4-methyl-1-pentene, and the like.

The olefin resin may also be a copolymer of a vinyl carboxylate, such as vinyl acetate, and the above-mentioned olefin, or a resin obtained by modifying the above-mentioned olefin homopolymer or the above-mentioned olefin copolymer with an unsaturated carboxylic acid or an unsaturated carboxylic acid derivative.

The fluororesin anchor coating agent is an anchor coating agent containing a fluororesin as a main component. Examples of the fluororesin include a fluorinated epoxy compound and a fluorinated epoxy acrylate.

The rubber anchor coating agent is an anchor coating agent containing rubber as a main component, and can be classified into chloroprene type anchor coating agents, styrene-butadiene rubber anchor coating agents, and nitrile rubber anchor coating agents. The rubber anchor coating agent may be an anchor coating agent in which a phenol resin or vinyl chloride has been blended.

Examples of the chloroprene anchor coating agent include anchor coating agents containing chloroprene rubber and a phenol resin as main components, anchor coating agents obtained by adding an alkylphenol resin to chloroprene rubber, and anchor coating agents obtained by graft polymerization of methyl methacrylate to chloroprene rubber.

Examples of the styrene-butadiene rubber anchor coating agents include anchor coating agents containing a styrene-butadiene copolymer and a styrene-isoprene copolymer. The copolymerization may be a random copolymerization or a block copolymerization.

The nitrile rubber anchor coating agent is an anchor coating agent containing a resin comprising a copolymer of butadiene and acrylonitrile as a main component.

The starch anchor coating agent is an anchor coating agent containing starch as a main component.

The starch may be a roasted dextrin obtained by heating a powder starch, a whitened dextrin obtained by treating starch with an acid, an oxidized starch in which a functional group, such as a carboxyl group, has been optionally introduced into the starch oxidized with an oxidizing agent, or modified starch such as enzyme-modified starch. In addition, the starch may be obtained by indirectly graft-polymerizing an acrylic resin or the like via a polyisocyanate, or be obtained by graft polymerization of acrylic acid and a photo-setting resin or a thermosetting resin. The above-mentioned anchor coating agent may also be a polymer blend combining starch or modified starch and a cellulose derivative. Further, the starch anchor coating agent may be a curable starch composition containing at least one blocking agent selected from β-diketones, acetoacetic esters, malonic esters, ketones having a hydroxyl group at the β-position, aldehydes having a hydroxyl group at the β-position, and esters having a hydroxyl group at the β-position.

The starch anchor coating agent may also contain a polyisocyanate curing agent, a plant-derived resin other than a starch, a metal complex, and the like.

The urea resin anchor coating agent is an anchor coating agent containing a urea resin as a main component, and is obtained by a condensation reaction of urea and formaldehyde. The urea resin anchor coating agent is cured by adding a small amount of ammonium chloride.

The melamine resin anchor coating agent is an anchor coating agent containing melamine (cyanuric acid amide) as a main component, and is obtained by polycondensation of melamine and formaldehyde. The melamine resin anchor coating agent may be mixed with the above-mentioned urea resin anchor coating agent or a phenol resin anchor coating agent described below.

The phenol resin anchor coating agent is an anchor coating agent containing a phenol resin as a main component, and is obtained by polycondensation of a phenol and formaldehyde. The phenol resin anchor coating agent may have a resol type phenol resin as a main component.

The polyaromatic anchor coating agent is an anchor coating agent containing a low molecular weight polymer of an aromatic polyimide as a main component.

The polysulfide anchor coating agent is an anchor coating agent comprising a polysulfide and a curing agent.

A more detailed description of each of the above-mentioned anchor coating agents is described in "Chemical Substances Contained in Everyday Products Series—Adhesives" (published by the National Institute of Technology and Evaluation, Chemical Substances Management Center), adhesive readers (published by the Japan Adhesive Industry Association), "Surface Treatment Technology Handbook—Adhesion and Coating to Electronic Materials" (published by NTS Inc.), and "Industry and Science Series—Adhesion and Adhesives" (published by Dainippon Tosho Publishing Co., Ltd.).

From the perspective of the adhesive properties, the anchor coating agent is preferably a two-part curable urethane anchor coating agent, an olefin resin anchor coating agent, an ester resin anchor coating agent, or a silane anchor coating agent.

One anchor coating agent may be used alone, or two or more anchor coating agents may be used in combination.

When two or more anchor coating agents are used in combination, a combination of a two-part curable urethane anchor coating agent and a silane anchor coating agent, a combination of an olefin resin anchor coating agent and a silane anchor coating agent, or a combination of a rubber anchor coating agent and a silane anchor coating agent is preferable.

The anchor coating agent may be applied in the absence of a solvent or diluted with various solvents and applied.

Further, the anchor coating agent may be any of a photosetting type, a thermosetting type, and a room temperature curable type, and may be cured by a combination of light, heat, and temperature. In addition, the anchor coating agent may also contain additives such as a tackifier, a plasticizer, a filler, a thickener, a pigment, an antioxidant, a defoaming agent, a flame retardant, a preservative, and the like. These additives and solvents are described in "Chemical Substances Contained in Everyday Products Series—Adhesives" (published by the National Institute of Technology and Evaluation, Chemical Substances Management Center), adhesive readers (published by the Japan Adhesive Industry Association), "Surface Treatment Technology Handbook—

Adhesion and Coating to Electronic Materials" (published by NTS Inc.), and "Industry and Science Series—Adhesion and Adhesives" (published by Dainippon Tosho Publishing Co., Ltd.).

[Surface Treatment]

The substrate surface to be coated with the coating material for prevention of metal corrosion of the present invention is may be subjected to a surface treatment, such as corona treatment, ozone treatment, electron beam treatment, ion treatment, flame treatment, plasma treatment, blast treatment, laser treatment, and the like.

The corona treatment is a treatment in which the air between discharge electrodes is ionized by high frequency waves generated from a corona treatment machine to generate charged particles. Those charged particles are irradiated on the substrate, thereby etching the substrate surface, and as a result, imparting effects such as improved wettability and introduction of functional groups. Specific examples of the corona treatment are disclosed in Japanese Unexamined Patent Publication Nos. H1-123835 and H4-59039. It is preferable that the discharge amount in the above-mentioned corona treatment be 10 W·min/m$^2$ or more. The upper limit of the discharge amount is not particularly limited, and from an economic perspective, it is preferable that it generally be 200 W·min/m$^2$ or less.

The ozone treatment is a treatment in which oxygen radicals or ozone are generated by, in the presence of oxygen, such as the oxygen in the air, irradiating UV rays using an excimer laser, a low-pressure mercury lamp, a high-pressure mercury lamp, or an arc lamp, thereby causing the substrate surface to be oxidized. Specific examples of the ozone treatment are disclosed in Japanese Unexamined Patent Publication Nos. S57-31937 and H17-188428. Generally, the ozone treatment is carried out using UV rays from 180 nm to 400 nm. When the ozone treatment is carried out by using UV rays of about 185 nm and UV rays of about 254 nm in combination, the oxidizing treatment effect is improved.

The electron beam treatment is a treatment in which an electron beam generated by an electron beam accelerator using a commercially-available electron beam irradiation apparatus is irradiated to etch and oxidize the substrate surface. The processing power in the electron beam treatment can be adjusted based on the acceleration voltage and electron flow. Generally, a processing power in which the accelerating voltage is 10 kV or more and 300 kV or less and the electron flow is 5 mA or more and 500 mA or less is preferable.

The ion treatment is a treatment for improving the properties of the substrate surface by injecting the ions present in a plasma generated by using an external electric field into the surface portion of the substrate, or by injecting the ions present in a plasma generated without using an external electric field, that plasma being generated using only the electric field produced by a negative high-voltage pulse applied on the substrate, into the surface portion of the substrate. The ion processing apparatus includes a mass analyzer for extracting only the necessary ions, an accelerator for electrically accelerating the ions, and a chamber in which a target, which is the object to be treated, is placed in a high-vacuum state. Generally, it is preferable to perform the treatment at a processing power of $10^{16}$ ions/cm$^2$ or less.

The flame treatment is a treatment in which air or oxygen and a natural gas, such as methane, propane, or butane, are blown onto the substrate in a completely combusted state. When the substrate is a film or a sheet, the flame treatment can be carried out by passing the substrate over a sufficiently cooled plated metal drum, and blowing flames on the surface opposite to the surface on which the substrate is in contact with the drum. As disclosed in Japanese Unexamined Patent Publication No. 2010-005947, the substrate can also be treated in the presence of a gas such as an alkoxysilane.

The plasma treatment is a treatment for imparting effects such as improved wettability and introduction of functional groups by irradiating a plasma generated by discharge in an inert gas atmosphere onto the substrate to etch the substrate surface. Examples of the plasma treatment may include atmospheric pressure plasma treatment and vacuum plasma treatment. Specific examples of the plasma treatment are disclosed in Japanese Unexamined Patent Publication Nos. H3-143930, H3-219082, 2010-227919, or H5-23579.

The blasting treatment is a treatment for imparting effects such as an increased surface area due to a roughening of the substrate surface and cleaning of the substrate surface by spraying an abrasive agent onto the substrate surface with an air compressor and the like. Examples of the abrasive agent generally include alumina particles, metal particles such as titanium particles, resin particles such as fluorine resin particles, and the like.

The laser treatment is a treatment for imparting effects such as formation of concavities and convexities on the substrate surface and cleaning of the substrate surface by irradiating high-energy laser light on the substrate. Thermal damage to the substrate can be reduced by using short-pulse and a high peak laser light.

[Drying Step]

In the drying step of the process for producing a coating film for prevention of metal corrosion, the temperature at which the liquid medium is removed is normally 20° C. or more and 150° C. or less, and from the perspective of the film formability of the coating film, preferably 30° C. or more and 140° C. or less, more preferably 40° C. or more and 130° C. or less, and even more preferably 50° C. or more and 120° C. or less. The removal time of the liquid medium is normally 1 second or more and 24 hours or less. As a heat source to be used for removing the liquid medium, heat roll contact, heat medium contact such as air, infrared heating, microwave heating, and the like can be applied.

[Resin Layer]

The multilayer structure A can further comprise a resin layer on the coating film. This resin layer is a layer comprising an additional resin component. Examples of the additional resin component include urethane resins, silicone resins, silane resins, ester resins, epoxy resins, acrylic resins, olefin resins, fluororesins, rubber resins, starches, urea resins, melamine resins, phenol resins, aromatic resins, sulfide resins, and the like. The details of these resins are the same as for the resin to be used in the above-mentioned anchor coating agent. The anchor coating layer and the resin layer may use the same resin component, or a different resin component. Further, the additional resin component may also be the same resin component as the resin component included in the above-mentioned coating material for prevention of metal corrosion.

From the perspective of the adhesive properties, the additional resin component is preferably a two-part curable urethane resin, a fluororesin, an epoxy resin, an olefin resin, or the same resin component as the resin component included in the coating material for prevention of metal corrosion.

One additional resin component can be used, or two or more additional resin components can be used in combination.

When using two or more resin components, a combination of a two-part curable urethane resin and a silane resin, a combination of a fluorine resin and a silane resin, a combination of an epoxy resin and a silane resin, a combination of an olefin resin and a silane resin, and a combination of a first resin component and a silane resin are preferable.

The resin layer may include the inorganic layered compound, the plasticizer, the alkali metal ion, and the like of the coating material for prevention of metal corrosion. The details of the plasticizer and the alkali metal ion are the same as for the plasticizer and the alkali metal ion described above.

When the resin layer contains a plasticizer, from the perspective of the stretchability during thermoforming, it is preferable that the content of the plasticizer included in the resin layer be, based on 100 parts by mass of the additional resin component, 20 parts by mass or more and 150 parts by mass or less, more preferable that it be 25 parts by mass or more and 120 parts by mass or less, even more preferable that it be 40 parts by mass or more and 120 parts by mass or less, and most preferable that it be 60 parts by mass or more and 110 parts by mass or less.

The anchor coating layer is formed using a coating solution for the anchor coating. When the coating solution for the anchor coating is a coating solution containing a liquid medium, the coating solution for the anchor coating may be prepared by, for example, dissolving or dispersing each component of the anchor coating agent in a solvent to prepare a solution for each component, and then mixing those solutions, or by dissolving or dispersing each component of the anchor coating agent in a single solvent. When the coating solution for the anchor coating is a coating solution that does not contain a solvent, the coating solution for the anchor coating may be prepared by mixing each of the components of the anchor coating agent. In addition, when using a resin coating solution to form the resin layer, the coating solution can be prepared by using the same method as for the anchor coating and the coating material for prevention of metal corrosion.

It is preferable that the thickness of the anchor coating layer and the thickness of the resin layer be both in the range of 0.05 μm or more and 500 μm or less, and preferable that it be in the range of 0.1 μm or more and 500 μm or less. The thickness of the coating film for prevention of metal corrosion is normally in the range of 0.05 μm or more and 50 μm or less, and it is preferable that it be in the range of 0.1 μm or more and 5 μm or less. It is preferable that the thickness of the anchor coating layer and the resin layer be both thicker than the coating film for prevention of metal corrosion.

[Multilayer Structure A]

When the substrate comprises a metal layer, examples of the structure of the multilayer structure A may include the following.
Substrate/coating film for prevention of metal corrosion
Substrate/coating film for prevention of metal corrosion/resin layer
Substrate/coating film for prevention of metal corrosion/resin layer/additional layer More specifically, the structure may be as follows.
Metal layer (substrate)/anchor coating layer (substrate)/coating film for prevention of metal corrosion
Metal layer (substrate)/anchor coating layer (substrate)/coating film for prevention of metal corrosion/resin layer
Metal layer (substrate)/anchor coating layer (substrate)/coating film for prevention of metal corrosion/resin layer/additional layer Here, this additional layer may have the same composition as each of the anchor coating layer, the resin layer, or the coating film for prevention of metal corrosion. Further, the above-mentioned anchor coating layer, coating film for prevention of metal corrosion, resin layer, and additional layer may be provided on only one side of the metal layer, or may be provided on both sides of the metal layer. In addition, the anchor coating layer, the coating film for prevention of metal corrosion, the resin layer, and the additional layer may be provided on the entire surface of the metal layer, or on a part of the surface of the metal layer.

Figure 7:
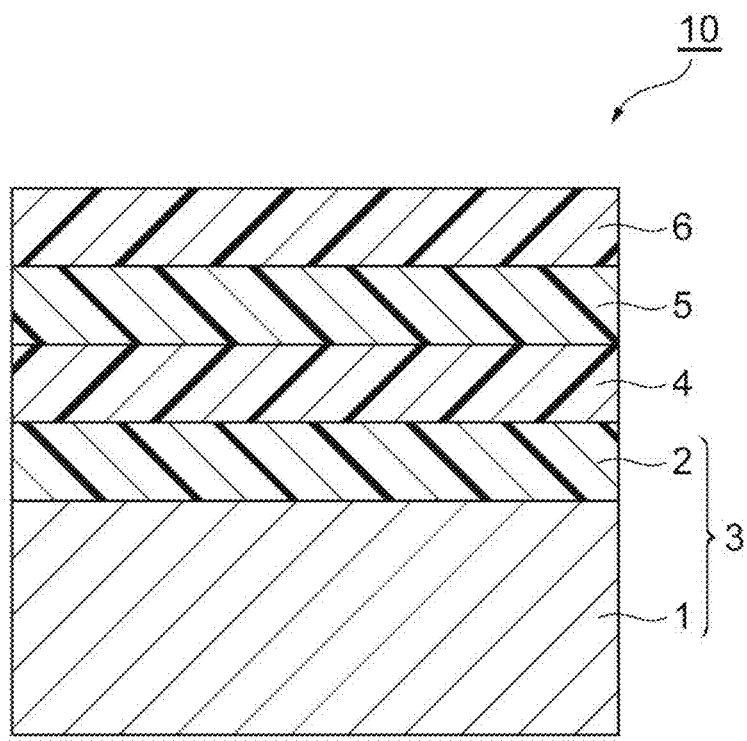
FIG. 7 is a cross-section view of the multilayer structure A.

FIG. 7 illustrates an example of a cross-sectional diagram of the multilayer structure A. In FIG. 7, reference numeral 1 denotes a metal layer, reference numeral 2 denotes the anchor coating layer, reference numeral 3 denotes the substrate, reference numeral 4 denotes the coating film for prevention of metal corrosion, reference numeral 5 denotes the resin layer, reference numeral 6 denotes the additional layer, and reference numeral 10 denotes the multilayer structure A. It is not necessary for the multilayer structure A to comprise the anchor coating layer 2, the resin layer 5, and the additional layer 6.

[Dry-Heat Treated Body]

When the coating film for prevention of metal corrosion comprises a resin component having the above-mentioned two or more functional groups, in order to improve metal corrosion prevention performance, it is preferable to subject the coating film to a dry-heat treatment to form a dry-heat treated body. The dry-heat treatment of the coating film can be carried out in the state of the multilayer structure having the coating film and the substrate. The dry-heat treatment is a treatment in which the object to be dry-heat treated is held in an atmosphere of 80° C. or more and 300° C. or less, and a water vapor concentration of less than 50 g/m$^3$. The dry-heat treatment temperature is preferably 100° C. or more and 200° C. or less, more preferably 120° C. or more and 200° C. or less, and even more preferably 120° C. or more and 180° C. or less. The dry-heat treatment time is normally 1 second to 1 hour. The water vapor concentration during the dry-heat treatment is preferably 0 g/m$^3$ or more and 40 g/m$^3$ or less. Examples of the method for carrying out the dry-heat treatment include contacting with a hot roll, contacting with a heat medium such as air, heating with infrared rays, heating with microwaves, and the like. Further, during the below-described thermoforming of a multilayer structure having the coating film and the substrate, the heating treatment during the thermoforming can be used as the dry-heat treatment.

[Wet-Heat Treated Body]

When the coating film for prevention of metal corrosion comprises a resin component having the above-mentioned two or more functional groups, in order to improve metal corrosion prevention performance, it is preferable to subject the above-mentioned dry-heat treated body to a wet-heat treatment to obtain a wet-heat treated body. The wet-heat treatment of the dry-heat treated body can be carried out in a state of the multilayer structure having the dry-heat treated body and the substrate. The wet-heat treatment is a treatment in which the object is held in water of 80° C. or more, or a treatment in which the object is held in an atmosphere having a temperature of 100° C. or more and a water vapor concentration of more than 290 g/m$^3$. The wet-heat treatment time is normally 1 second to 1 hour. When treating in an atmosphere having a temperature of 100° C. or more and a water vapor concentration of more than 290 g/m$^3$, it is preferable that the temperature be 120° C. or more and 200° C. or less, and it is preferable that the water vapor concentration be 500 g/m³ or more and 20000 g/m³ or less. When treating in water of 80° C. or more, it is preferable that the temperature be 100° C. or more and 140° C. or less. Before carrying out the wet-heat treatment, the dry-heat treated body can be aged under conditions of, for example, 23° C. and a humidity of 50% RH.

In order to remove the moisture contained in the wet-heat treated body, a dry-heat treatment can be carried out after the wet-heat treatment.

The dry-heat treatment is, normally, carried out at a humidity of 50% RH or less and a temperature of 20° C. or more and 100° C. or less for 1 second or more and 24 hours or less.

Further, for the purpose of improving water resistance, wettability, scratch resistance and the like, the coating film for prevention of metal corrosion may also be subjected to electron beam irradiation, ultraviolet irradiation, and the like.

It is preferable that the multilayer structure comprising the substrate, which comprises the metal layer and the anchor coating layer, and the coating film for prevention of metal corrosion is produced by a production process comprising: a step of forming an anchor coating layer adjacent to a metal layer by coating a coating solution for an anchor coating including a liquid medium and an anchor coating agent on a surface of the metal layer to form an anchor coated film, and removing the liquid medium from the anchor coated film; a coating step of coating a surface of the anchor coating layer with the coating material for prevention of metal corrosion according to the present invention; and a drying step of removing the liquid medium from the coating material for prevention of metal corrosion used for coating in the coating step to obtain a coating film for prevention of metal corrosion adjacent to the anchor coating layer.

When producing the multilayer structure, a step of forming a substrate, a coating step of coating the substrate with the coating material for prevention of metal corrosion of the present invention, and a drying step of removing a liquid medium from the coating material for prevention of metal corrosion used for coating in the coating step to obtain a coating film for prevention of metal corrosion, can be carried out continuously. Herein, "carried out continuously" encompasses, for example, cases in which each step is carried out in the same apparatus, and cases in which each step is carried out by a plurality of continuous apparatus. Further, the next step can also be carried out before each step is complete. In addition, a step of forming an anchor coating layer and a resin layer can also be carried out continuously in a similar manner.

Further, it is preferable that the multilayer structure comprising the substrate, which comprises the metal layer and the anchor coating layer, the coating film for prevention of metal corrosion, and the resin layer is produced by a production process comprising: a step of forming an anchor coating layer adjacent to a metal layer by coating a coating solution for an anchor coating including a liquid medium and an anchor coating agent on a surface of the metal layer to form an anchor coated film, and removing the liquid medium; a coating step of coating a surface of the anchor coating layer with the coating material for prevention of metal corrosion according to the present invention; a drying step of removing the liquid medium from the coating material for prevention of metal corrosion used for coating in the coating step to obtain a coating film for prevention of metal corrosion adjacent to the anchor coating layer; and a step of forming a resin layer adjacent to the coating film for prevention of metal corrosion by coating a resin coating solution comprising a liquid medium and a resin component on a surface of the coating film for prevention of metal corrosion to form a resin coated film, and then removing the liquid medium from the resin coated film.

Examples of the method of coating with the coating material for prevention of metal corrosion include: gravure methods such as a direct gravure method and a reverse gravure method; roll coating methods such as a double roll beat coating method, a bottom-feed triple reverse coating method; a doctor knife method; a die coating method; a bar coating method; a dipping method; a spray coating method; a curtain coating method; a spin coating method; a flexo-coating method; a screen coating method; a coating method that uses a brush or a writing brush, and the like. Since the coating film can be produced easily, it is preferable to employ a dipping method, a spray coating method, or a gravure method. The coating film for prevention of metal corrosion may be formed either on a part of the surface of the substrate or on the entire surface of the substrate. It is sufficient for coating film for prevention of metal corrosion to be present above at least one surface of the substrate. Specifically, it is not always necessary for the coating film for prevention of metal corrosion to be in contact with the substrate, another layer may be present between the substrate and the coating film for prevention of metal corrosion.

The dipping method is a method for forming a coated film in which a substrate is held by a jig, dipped in the coating material for prevention of metal corrosion, left, and then lifted out from the coating material for prevention of metal corrosion. Specifically, such a dipping method is disclosed in Japanese Unexamined Patent Publication No. 2006-239561.

When dipping the substrate in the coating material for prevention of metal corrosion, if the substrate is a flat, plate-shaped substrate, it is preferable to dip the substrate in a perpendicular manner with respect to the liquid surface. If the substrate has a three-dimensional shape, such as a container or a bottle, in order to suppress the occurrence of air pockets, it is preferable to dip the substrate while inclining the substrate as appropriate. The speed for dipping the substrate is normally 1 nm/sec or more and 1 m/sec or less, and from the perspective of productivity, it is preferable that it be 1 μm/sec or more and 1 m/sec or less.

When lifting out the substrate after the dipping, if the substrate is a flat, plate-shaped substrate, it is preferable to lift out the substrate in a perpendicular manner with respect to the liquid surface, and if the substrate has a three-dimensional shape, such as a container or a bottle, in order to prevent unevenness in the thickness of the coated film, it is preferable to lift out the substrate while inclining the substrate as appropriate. The speed for lifting out the substrate is normally 1 nm/sec or more and 1 m/sec or less, and from the perspective of productivity, it is preferable that it be 1 μm/sec or more and 1 m/sec or less. The thickness of the coated film changes depending on the lifting speed and the specific weight, the concentration, and the viscosity of the coating solution.

The coating solution for the anchor coating and the resin coating solution can also be applied by the same method as the coating material for prevention of metal corrosion. Further, as the method for removing the liquid medium from the anchor coated film and the resin coated film, the same method as the method for removing the liquid medium from the coating material for prevention of metal corrosion described above can be used.

Examples of the form of the substrate and the multilayer structure in the present invention include, for example, a film, a sheet, and a molded product. Examples of the substrate comprising the metal layer include a glossy metal-sputtered sheet or non-woven fabric obtained by sputtering a metal onto a resin sheet or non-woven fabric, a metal heat slinger of a heat exchanger, an electromagnet and an electronic component, a metal wire, and the like.

Applications of the coating film for prevention of metal corrosion of the present invention include corrosion prevention of metal substrates and discoloration prevention of metal substrates. Further, because the coating film for prevention of metal corrosion according to the present invention exhibits its performance even when it has a thin film thickness, the coating film for prevention of metal corrosion can also be preferably employed in applications that place importance on texture, such as castings.

Further, a multilayer structure comprising a layer consisting of a conventional corrosion prevention coating material and a coating film obtained by using the coating material for prevention of metal corrosion of the present invention has even higher metal corrosion prevention performance. In such a case, even when the layer consisting of a conventional corrosion prevention coating material is a thin layer, a metal corrosion prevention effect can be exhibited for the same period as in the past.

EXAMPLES

The present invention is now described by way of the following examples. First, the methods for measuring the physical properties in the following examples are described.

[Thickness Measurement]

The thickness of the metal layer was measured using a digital thickness meter (contact-type thickness meter, trade name: Ultra-High Precision Deci-Micro Head MH-15M, manufactured by Nippon Kogaku K.K.). The thicknesses of the below-described anchor coating layer, coating film for prevention of metal corrosion, and resin layer were obtained by cross-sectional observation using a transmission electron microscope (TEM).

[Particle Size Measurement]

The clay mineral particle size was measured using a laser diffraction/scattering particle size distribution analyzer (LA910 manufactured by Horiba, Ltd.). The average particle size of the clay minerals in the coating solutions (1) to (6) and (11) described below was measured with a paste cell at an optical path length of 50 µm. Further, the average particle size of the clay minerals in a solution of those coating solutions diluted by a factor of about 200 was measured by the flow cell at an optical path length of 4 mm. In both cases, the values for the average particle size were the same. This fact confirmed that the clay mineral in the coating solutions was fully swollen and cleaved. These measurement values of the coating solution were taken to be the average particle size L of the clay mineral in the coating films (1) to (6) and (11).

[Aspect Ratio Calculation]

The diffraction measurement of the clay mineral was conducted based on the powder method using an X-ray diffraction apparatus (XD-5A, manufactured by Shimadzu Corporation) to obtain the unit thickness a of the clay mineral. Using the average particle size L obtained by the method described above, the aspect ratio Z of the clay mineral was calculated from the equation $Z=L/a$. X-ray diffraction measurement was also performed on a dried product of the coating solutions (1) to (6) and (11), from which it was confirmed that, since the interplanar spacing of the clay mineral in the dried product of the coating solutions (1) to (6) and (11) had been enlarged compared to a clay mineral of a raw material, the clay mineral was dispersed in the resin.

[Dry-Heat Treatment]

Multilayer structures (210 mm×300 mm) were heat treated for 60 minutes in an oven at 120° C. and a water vapor concentration of 5 g/m$^3$.

[Metal Corrosion Test 1]

The multilayer structures (1A) to (12A) described below were subjected to a salt spray test based on JIS H8502 using a cycle method. The salt spray test was carried out by spraying salt water for 2 hours at 25° C., then leaving to dry for 4 hours at 60° C. and 20 to 30% RH, and finally leaving for 2 hours at 50° C. and 95% RH. This series of processes made up one cycle and was used to carry out the test. The samples after the test were visually evaluated.

◯ . . . No occurrence of corrosion
Δ . . . Corrosion occurred on some parts of the sample
X . . . Corrosion occurred on the whole surface of the sample In addition, the salt-sprayed surface of the multilayer structures (1A) to (6A) that had been subjected to the salt spray test was photographed using a digital camera. The corroded portions and the non-corroded portions on the salt-sprayed surface were subjected to image processing using image software (WINROOF) to obtain the surface area of each of those portions in order to calculate corrosion occurrence (%) based on the following formula.

Corrosion occurrence(%)=(surface area of corroded portion)/(surface area of corroded portion+surface area of non-corroded portion)×100

[Metal Corrosion Test 2]

The multilayer structures (13A) to (16A) described below were dipped for 96 hours in 23° C., 5% salt water to carry out a salt water immersion test. The post-immersion multilayer structures were photographed using a digital camera, and the corroded portions and the non-corroded portions were subjected to image processing using image processing software (WINROOF) to obtain the surface area of each of those portions in order to calculate corrosion occurrence (%) based on the following formula.

Corrosion occurrence (%)=(surface area of corroded portion)/(surface area of corroded portion+surface area of non-corroded portion)×100

[Oxygen Permeability Measurement]

The oxygen permeabilities of the multilayer structures (1B) to (10B) described below were measured under conditions of 23° C. and 90% RH using an ultrasensitive oxygen permeability tester (OX-TRAN ML, manufactured by MOCON Inc.) based on JIS K7126.

[Adhesion Test]

Under conditions of 23° C. and 50% RH, 10×10 cuts of 2 mm square were formed on the multilayer structures (13A) to (16A) described below until the cuts were reached from the surface of the multilayer structure to the substrate, and a peeling test was carried out with cellophane tape from the four corners. The number of squares where the coating film remained on the substrate was evaluated. A larger number of remaining squares indicates stronger adhesion between the substrate and the coating film. Cases in which 100 squares remained were determined to exhibit very good adhesion, and were defined as ◯. Cases in which 99 to 50 squares remained were determined to exhibit good adhesion, and were defined as A. Cases in which 49 or less squares remained were determined to exhibit poor adhesion, and were defined as X.

[Preparation of Coating Solutions]

(1) Preparation of Coating Solution (1)

In a dispersion kettle (trade name: Despa MH-L, manufactured by Asada Tekko Co., Ltd.), 1300 g of deionized water (specific electric conductivity 0.7 s/cm or less) and 130 g of polyvinyl alcohol (AQ2117, manufactured by Kuraray Co., Ltd., degree of saponification 99.6%, degree of polymerization 1700) were mixed, and the temperature was increased to 95° C. under low-speed stirring (1500 rpm, circumferential velocity 4.1 m/min). The mixture system was stirred for 30 minutes at the same temperature to dissolve the polyvinyl alcohol, and then cooled to 60° C. to obtain a polyvinyl alcohol aqueous solution. While stirring the polyvinyl alcohol aqueous solution (60° C.) under the same conditions, an alcohol aqueous solution prepared by mixing 122 g of 1-butanol, 122 g of isopropanol, and 520 g of deionized water was added dropwise over 5 minutes. After the dropping was finished, the stirring conditions were switched to high-speed stirring (3000 rpm, circumferential velocity=8.2 m/min), 82 g of high-purity montmorillonite (trade name: Kunipia G manufactured by Kunimine Industries Co., Ltd.) were gradually added to the stirred system, and after the addition was finished, stirring was continued at 60° C. for 60 minutes. Then, 243 g of isopropanol were further added over 15 minutes, and next the mixture system was cooled to room temperature to obtain a clay mineral-containing solution. To this clay mineral-containing solution, 0.06 parts by mass of a non-ionic surfactant (polydimethylsiloxane-polyoxyethylene copolymer, trade name: SH3746, manufactured by Dow Corning Toray Co., Ltd.) were added (based on 100 parts by mass of the below-described coating solution) under low-speed stirring (1500 rpm, circumferential velocity 4.1 m/min), and the resultant mixture was adjusted with an ion-exchange resin to a pH of 6 to prepare a clay mineral dispersion.

In addition, in a separate dispersion kettle (trade name: Despa MH-L, manufactured by Asada Tekko Co., Ltd.), 1067 g of deionized water (specific electric conductivity 0.7 s/cm or less) and 33 g of polyacrylic acid (manufactured by Wako Pure Chemical Industries, Ltd., average molecular weight 1000000) were mixed, and a resin (A3) solution was prepared under low-speed stirring (1500 rpm, circumferential velocity 4.1 m/min) at room temperature.

A mixed solution was obtained by gradually mixing 2519 g of the clay mineral dispersion liquid and 1100 g of the resin (A3) solution under low-speed stirring (1500 rpm, circumferential velocity 4.1 m/min), and then using a high-pressure dispersion apparatus (trade name: Ultra high-pressure homogenizer M110-E/H, manufactured by Microfluidics Corporation), the mixed solution was treated under pressure conditions of 1100 kgf/cm$^2$ to obtain a coating solution (1).

The average particle size L of the cleaved montmorillonite in the coating solution (1) was 560 nm, the value a obtained from powder X-ray diffraction was 1.2156 nm, and the aspect ratio Z was 460.

(2) Preparation of Coating Solution (2)

A coating solution (2) was obtained by gradually mixing 6.1 g of a mixture (VERZONE Green SH-P: manufactured by Daiwa Fine Chemicals Co., Ltd.) of an aromatic compound salt and a heterocyclic compound as the corrosion inhibitor to the coating solution (1) under low-speed stirring (1500 rpm, circumferential velocity 4.1 m/min). The average particle size L of the cleaved montmorillonite in the coating solution (2) was 560 nm, the value a obtained from powder X-ray diffraction was 1.2156 nm, and the aspect ratio Z was 460. Further, based on a total content of the inorganic layered compound and the corrosion inhibitor of 100% by mass, the corrosion inhibitor was 6.9% by mass.

(3) Preparation of Coating Solution (3)

A coating solution (3) was obtained in the same manner as the coating solution (2), except that 1,2,3-benzotriazole (VERZONE Crystal #120: manufactured by Daiwa Fine Chemicals Co., Ltd.) was used as the corrosion inhibitor.

The average particle size L of the cleaved montmorillonite in the coating solution (3) was 560 nm, the value a obtained from powder X-ray diffraction was 1.2156 nm, and the aspect ratio Z was 460. Further, based on a total content of the inorganic layered compound and the corrosion inhibitor of 100% by mass, the corrosion inhibitor was 6.9% by mass.

(4) Preparation of Coating Solution (4)

A coating solution (4) was obtained in the same manner as the coating solution (2), except that an amine carboxylate (BF5-365: manufactured by Tanimura Corp.) was used as the corrosion inhibitor. The average particle size L of the cleaved montmorillonite in the coating solution (4) was 560 nm, the value a obtained from powder X-ray diffraction was 1.2156 nm, and the aspect ratio Z was 460. Further, based on a total content of the inorganic layered compound and the corrosion inhibitor of 100% by mass, the corrosion inhibitor was 6.9% by mass.

(5) Preparation of Coating Solution (5)

A coating solution (5) was obtained in the same manner as the coating solution (2), except that an organic carboxylate in triethanol amine salt (Sanbit PMT: manufactured by Sanshin Chemical Industry Co., Ltd.) was used as the corrosion inhibitor. The average particle size L of the cleaved montmorillonite in the coating solution (5) was 560 nm, the value a obtained from powder X-ray diffraction was 1.2156 nm, the aspect ratio Z was 460. Further, based on a total content of the inorganic layered compound and the corrosion inhibitor of 100% by mass, the corrosion inhibitor was 6.9% by mass.

(6) Preparation of Coating Solution (6)

A coating solution (6) was obtained in the same manner as the coating solution (2), except that an alkyl-trisacrylate (CeBoLS: manufactured by Toyo Pharmaceutical Co., Ltd.) was used as the corrosion inhibitor, and the added amount was changed to 40.7 g. The average particle size L of the cleaved montmorillonite in the coating solution (6) was 560 nm, the value a obtained from powder X-ray diffraction was 1.2156 nm, and the aspect ratio Z was 460. Further, based on a total content of the inorganic layered compound and the corrosion inhibitor of 100% by mass, the corrosion inhibitor was 6.9% by mass.

(7) Preparation of Coating Solution (7)

In a dispersion kettle (trade name: Despa MH-L, manufactured by Asada Tekko Co., Ltd.), 1300 g of deionized water (specific electric conductivity 0.7 µs/cm or less) and 130 g of polyvinyl alcohol (AQ2117, manufactured by Kuraray Co., Ltd., degree of saponification 99.6%, degree of polymerization 1700) were mixed, and the temperature was increased to 95° C. under low-speed stirring (1500 rpm, circumferential velocity 4.1 m/min). The mixture system was stirred for 30 minutes at the same temperature to dissolve the polyvinyl alcohol, and then cooled to 60° C. to obtain a polyvinyl alcohol aqueous solution. While stirring the polyvinyl alcohol aqueous solution (60° C.) under the same conditions, an alcohol aqueous solution prepared by mixing 122 g of 1-butanol, 122 g of isopropanol, and 520 g of deionized water was added dropwise over 5 minutes.

After the dropping was finished, 243 g of isopropanol were further added over 15 minutes, next the mixture system was cooled to room temperature, 0.06 parts by mass of a non-ionic surfactant (polydimethylsiloxane-polyoxyethylene copolymer, trade name: SH3746, manufactured by Dow Corning Toray Co., Ltd.) were added (based on 100 parts by mass of the below-described coating solution) under low-speed stirring (1500 rpm, circumferential velocity 4.1 m/min), and the resultant mixture was adjusted with an ion-exchange resin to a pH of 6 to prepare a polyvinyl alcohol mixed solution.

In addition, in a separate dispersion kettle (trade name: Despa MH-L, manufactured by Asada Tekko Co., Ltd.), 1067 g of deionized water (specific electric conductivity 0.7 µs/cm or less) and 33 g of polyacrylic acid (manufactured by Wako Pure Chemical Industries, Ltd., average molecular weight 1000000) were mixed, and a resin (A3) solution was prepared under low-speed stirring (1500 rpm, circumferential velocity 4.1 m/min) at room temperature.

A mixed solution was obtained by gradually mixing 2437 g of the polyvinyl alcohol mixed solution and 1100 g of the resin (A3) solution under low-speed stirring (1500 rpm, circumferential velocity 4.1 m/min), and then using a high-pressure dispersion apparatus (trade name: Ultra high-pressure homogenizer M110-E/H, manufactured by Microfluidics Corporation), the mixed solution was treated under pressure conditions of 1100 kgf/cm$^2$ to obtain a high-pressure dispersion liquid (7).

A coating solution (7) was obtained by gradually mixing 6.1 g of a mixture (VERZONE Green SH-P: manufactured by Daiwa Fine Chemicals Co., Ltd.) of an aromatic compound salt and a heterocyclic compound as the corrosion inhibitor to the high-pressure dispersion liquid (7) under low-speed stirring (1500 rpm, circumferential velocity 4.1 m/min).

(8) Coating Solution (8)

A coating solution (8) was obtained by mixing a mixture (VERZONE Green SH-P: manufactured by Daiwa Fine Chemicals Co., Ltd.) of an aromatic compound salt and a heterocyclic compound, water, isopropanol, and 1-butanol in a mass ratio of 6.1/2887/365/122.

(9) Preparation of Coating Solution (9)

A coating solution (9) was obtained by mixing the main agent and the curing agent of a two-liquid curable urethane coating agent (main agent: EL510-1, curing agent: CAT-RT87; both manufactured by Toyo-Morton, Ltd.) in a mass ratio of 5/1, and adjusting the resultant mixture with ethyl acetate to a solid content concentration of 10% by weight.

(10) Preparation of Coating Solution (10)

A coating solution (10) was obtained by mixing a fluorine coating agent (Zeffle GK-570, manufactured by Daikin Industries, Ltd.) and a cross-linking agent (Duranate TPA-100, manufactured by Asahi Kasei Chemicals Corporation) in a mass ratio of 5/0.68, and adjusting the resultant mixture with butyl acetate to a solid content concentration of 10% by mass.

(11) Preparation of Coating Solution (11) A coating solution (11) was obtained by gradually mixing 20 g of a carbodiimide (Carbodilite V-02: manufactured by Nisshinbo Chemical Inc.) to 3619 g of the coating solution (3) under low-speed stirring (1500 rpm, circumferential velocity 4.1 m/min). The average particle size L of the cleaved montmorillonite in the coating solution (11) was 560 nm, the value a obtained from powder X-ray diffraction was 1.2156 nm, the aspect ratio Z was 460. Further, based on a total content of the inorganic layered compound and the corrosion inhibitor of 100% by mass, the corrosion inhibitor was 6.9% by mass.

Example 1

As a metal layer, a 3 mm-thick iron sheet was used. An anchor coating layer was formed by coating the metal layer with the coating solution (9) using a bar coater (#28), and then drying at 80° C. for 20 minutes. Next, a coating film (1) was formed by coating the anchor coating layer with the above-described coating solution (2) using a bar coater (#8), and then drying at 80° C. for 20 minutes. Then, a resin layer was formed by coating the coating film (1) with the coating solution (10) using a bar coater (#28), and then drying at 80° C. for 20 minutes, to obtain a multilayer structure (1) having a layer structure of metal layer/anchor coating layer/coating film (1)/resin layer. The thickness of the anchor coating layer was 20 µm, the thickness of the coating film (1) was 1 µm, and the thickness of the resin layer was 20 µm. The obtained multilayer structure (1) was subjected to the dry-heat treatment, and then aged for 24 hours under a 23° C., 50% RH atmosphere to obtain a multilayer structure (1A). The multilayer structure (1A) was subjected to three cycles of a salt spray test. The results are shown in Table 1. A photograph of the multilayer structure (1A) after the salt spray test is shown in FIG. 1.

Comparative Example 1

Figure 2:
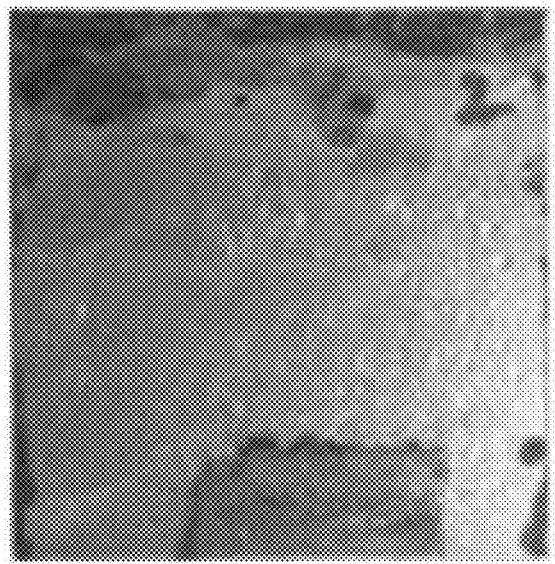
FIG. 2 is a photograph of a multilayer structure (2A) of Comparative Example 1 after a salt spray test.

As a metal layer, a 3 mm-thick iron sheet was used. An anchor coating layer was formed by coating the metal layer with the coating solution (9) using a bar coater (#28), and then drying at 80° C. for 20 minutes. Next, the anchor coating layer was coated with the coating solution (7) using a bar coater (#28), and then dried at 80° C. for 20 minutes. A coating film (2) was formed by repeating the operation of coating with the coating solution (7) using a bar coater (#28) and then drying at 80° C. for 20 minutes another 14 times. Then, a resin layer was formed by coating the coating film (2) with the coating solution (10) using a bar coater (#28), and then drying at 80° C. for 20 minutes, to obtain a multilayer structure (2) having a layer structure of metal layer/anchor coating layer/coating film (2)/resin layer. The thickness of the anchor coating layer was 20 µm, the thickness of the coating film (2) was 30 µm, and the thickness of the resin layer was 20 µm. The obtained multilayer structure (2) was subjected to the dry-heat treatment, and then aged for 24 hours under a 23° C., 50% RH atmosphere to obtain a multilayer structure (2A). The multilayer structure (2A) was subjected to three cycles of a salt spray test. The results are shown in Table 1. A photograph of the multilayer structure (2A) after the salt spray test is shown in FIG. 2.

Comparative Example 2

Figure 3:
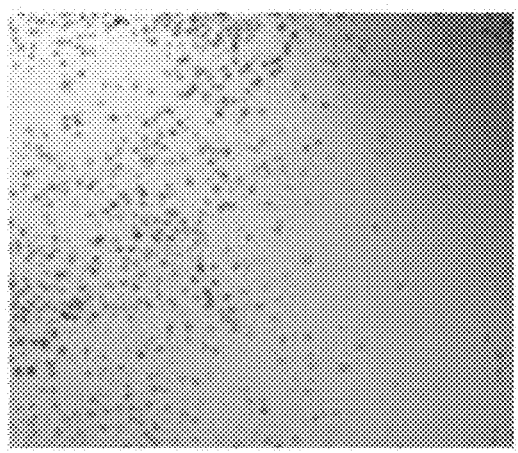
FIG. 3 is a photograph of a multilayer structure (3A) of Comparative Example 2 after a salt spray test.

A multilayer structure (3) having a layer structure of metal layer/anchor coating layer/coating film (3)/resin layer was obtained in the same manner as in Example 1, except that a coating film (3) was formed using the coating solution (1) instead of the coating solution (2). The thickness of the anchor coating layer was 20 µm, the thickness of the coating film (3) was 1 µm, and the thickness of the resin layer was 20 µm. The obtained multilayer structure (3) was subjected to the dry-heat treatment, and then aged for 24 hours under a 23° C., 50% RH atmosphere to obtain a multilayer structure (3A). The multilayer structure (3A) was subjected to three cycles of a salt spray test. The results are shown in Table 1. A photograph of the multilayer structure (3A) after the salt spray test is shown in FIG. 3.

Comparative Example 3

Figure 4:
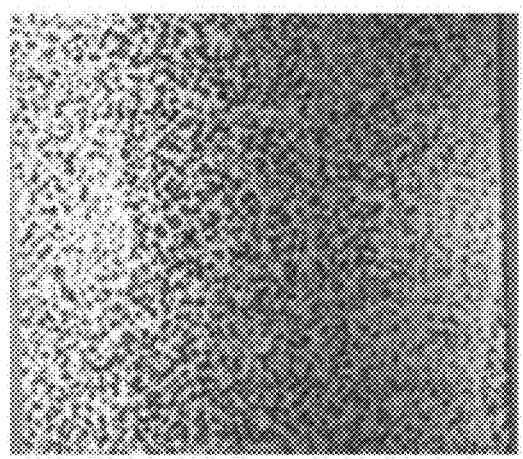
FIG. 4 is a photograph of a multilayer structure (4A) of Comparative Example 3 after a salt spray test.

A multilayer structure (4) having a layer structure of metal layer/anchor coating layer/resin layer was obtained in the same manner as in Example 1, except that a coating film (2) was not used. The thickness of the anchor coating layer was 20 μm and the thickness of the resin layer was 20 μm. The obtained multilayer structure (4) was subjected to the dry-heat treatment, and then aged for 24 hours under a 23° C., 50% RH atmosphere to obtain a multilayer structure (4A). The multilayer structure (4A) was subjected to three cycles of a salt spray test. The results are shown in Table 1. A photograph of the multilayer structure (4A) after the salt spray test is shown in FIG. 4.

Comparative Example 4

Figure 5:
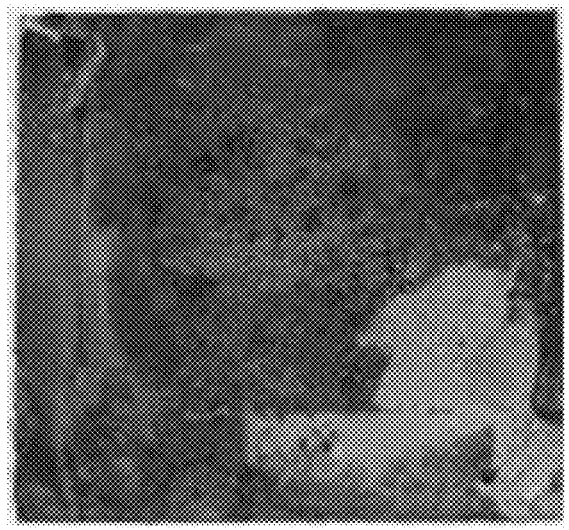
FIG. 5 is a photograph of a multilayer structure (5A) of Comparative Example 4 after a salt spray test.

A multilayer structure (5) having a layer structure of metal layer/anchor coating layer/coating film (5)/resin layer was obtained in the same manner as in Example 1, except that a coating film (5) was formed using the coating solution (7) instead of the coating solution (2). The thickness of the anchor coating layer was 20 μm, the thickness of the coating film (5) was 1 μm, and the thickness of the resin layer was 20 μm. The obtained multilayer structure was subjected to the dry-heat treatment, and then aged for 24 hours under a 23° C., 50% RH atmosphere to obtain a multilayer structure (5A). The multilayer structure (5A) was subjected to three cycles of a salt spray test. The results are shown in Table 1. A photograph of the multilayer structure (5A) after the salt spray test is shown in FIG. 5.

Comparative Example 5

Figure 6:
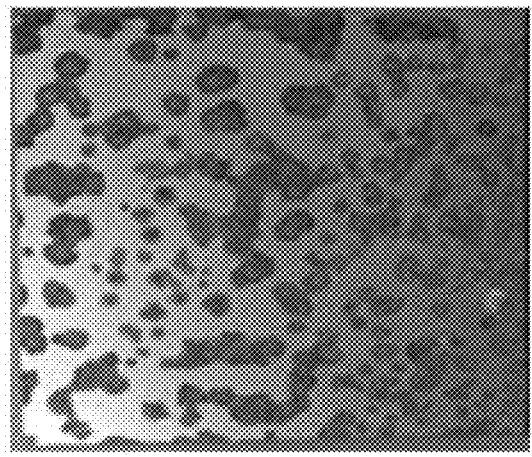
FIG. 6 is a photograph of a multilayer structure (6A) of Comparative Example 5 after a salt spray test.

As a metal layer, a 3 mm-thick iron sheet was used. A corrosion inhibitor layer was formed by coating the metal layer with the coating solution (8) using a bar coater (#8), and then drying at 80° C. for 20 minutes. Next, an anchor coating layer was formed by coating the corrosion inhibitor layer with the coating solution (9) using a bar coater (#28), and then drying at 80° C. for 20 minutes. Next, a coating film (6) was formed by coating the anchor coating layer with the above-described coating solution (1) using a bar coater (#8), and then drying at 80° C. for 20 minutes. Then, a resin layer was formed by coating the coating film (6) with the coating solution (10) using a bar coater (#28), and then drying at 80° C. for 20 minutes, to obtain a multilayer structure (6) having a layer structure of metal layer/corrosion inhibitor layer/anchor coating layer/coating film (6)/resin layer. The thickness of the corrosion inhibitor layer was 0.1 μm or less, the thickness of the anchor coating layer was 20 μm, the thickness of the coating film (6) was 1 μm, and the thickness of the resin layer was 20 μm. The obtained multilayer structure (6) was subjected to the dry-heat treatment, and then aged for 24 hours under a 23° C., 50% RH atmosphere to obtain a multilayer structure (6A). The multilayer structure (6A) was subjected to three cycles of a salt spray test. The results are shown in Table 1. A photograph of the multilayer structure (6A) after the salt spray test is shown in FIG. 6.

TABLE 1

| | | | Coating film | | | | |
|---|---|---|---|---|---|---|---|
| | Corrosion inhibitor layer | Anchor coating layer | Inorganic layered compound Presence/Absence | Corrosion inhibitor Presence/Absence | Resin layer | Salt spray test | Corrosion occurrence (%) |
| Example 1 | absent | urethane | present | present | fluorine-based | ○ | 1> |
| Comparative Example 1 | absent | urethane | absent | present | fluorine-based | Δ | 25 |
| Comparative Example 2 | absent | urethane | present | absent | fluorine-based | Δ | 12 |
| Comparative Example 3 | absent | urethane | — | — | fluorine-based | X | 36 |
| Comparative Example 4 | absent | urethane | absent | present | fluorine-based | X | 96 |
| Comparative Example 5 | present | urethane | present | absent | fluorine-based | X | 36 |

Example 2

As a metal layer, a 2.5 mm-thick copper sheet was used. A coating film (7) was formed by coating the metal layer with the coating solution (3) using a bar coater (#8), and then drying at 80° C. for 20 minutes, to obtain a multilayer structure (7) comprising a metal layer and the coating film (7). The thickness of the coating film (7) was 1 μm. The obtained multilayer structure (7) was subjected to the dry-heat treatment, and then aged for 24 hours under a 23° C., 50% RH atmosphere to obtain a multilayer structure (7A). The multilayer structure (7A) was subjected to one cycle of a salt spray test. The results are shown in Table 2.

Example 3

A multilayer structure (8) comprising a metal layer and a coating film (8) was obtained in the same manner as in Example 2, except that the coating film (8) was formed using the coating solution (4) instead of the coating solution (3). The thickness of the coating film (8) was 1 μm. The obtained multilayer structure (8) was subjected to the dry-heat treatment, and then aged for 24 hours under a 23° C., 50% RH atmosphere to obtain a multilayer structure (8A). The multilayer structure (8A) was subjected to one cycle of a salt spray test. The results are shown in Table 2.

Example 4

A multilayer structure (9) comprising a metal layer and a coating film (9) was obtained in the same manner as in Example 2, except that the coating film (9) was formed using the coating solution (5) instead of the coating solution (3). The thickness of the coating film (9) was 1 μm. The obtained multilayer structure (9) was subjected to the dry-heat treatment, and then aged for 24 hours under a 23° C., 50% RH atmosphere to obtain a multilayer structure (9A). The multilayer structure (9A) was subjected to one cycle of a salt spray test. The results are shown in Table 2.

Example 5

A multilayer structure (10) comprising a metal layer and a coating film (10) was obtained in the same manner as in Example 2, except that the coating film (10) was formed using the coating solution (6) instead of the coating solution (3). The thickness of the coating film (10) was 1 μm. The obtained multilayer structure (10) was subjected to the dry-heat treatment, and then aged for 24 hours under a 23° C., 50% RH atmosphere to obtain a multilayer structure (10A). The multilayer structure (10A) was subjected to one cycle of a salt spray test. The results are shown in Table 2.

Example 6

As a metal layer, a 2.5 mm-thick copper sheet was used. A coating film (11) was formed by coating the metal layer with the coating solution (3) using a bar coater (#8), and then drying at 80° C. for 20 minutes, to obtain a multilayer structure (11) comprising a metal layer and the coating film (11). The thickness of the coating film (11) was 1 μm. The obtained multilayer structure (11) was aged for 24 hours under a 23° C., 50% RH atmosphere to obtain a multilayer structure (11A). The multilayer structure (11A) was subjected to one cycle of a salt spray test. The results are shown in Table 2.

Example 7

A multilayer structure (12) was obtained in the same manner as in Example 6, except that a coating film (12) was formed using the coating solution (11) instead of the coating solution (3). The thickness of the coating film (12) was 1 μm. The obtained multilayer structure was aged for 24 hours under a 23° C., 50% RH atmosphere to obtain a multilayer structure (12A). The multilayer structure (12A) was subjected to one cycle of a salt spray test. The results are shown in Table 2.

TABLE 2

|  | Salt spray test |
| --- | --- |
| Example 2 | ◯ |
| Example 3 | ◯ |
| Example 4 | ◯ |
| Example 5 | ◯ |
| Example 6 | ◯ |
| Example 7 | ◯ |

Reference Example 1

A multilayer structure (1B) was obtained in the same manner as in Example 1, except that a 25 μm-thick biaxially stretched nylon film was used instead of the 3 mm-thick iron sheet. The measurement result of the oxygen permeability of the multilayer structure (1B) is shown in Table 3.

Reference Example 2

A multilayer structure (2B) was obtained in the same manner as in Comparative Example 1, except that a 25 μm-thick biaxially stretched nylon film was used instead of the 3 mm-thick iron sheet. The measurement result of the oxygen permeability of the multilayer structure (2B) is shown in Table 3.

Reference Example 3

A multilayer structure (3B) was obtained in the same manner as in Comparative Example 2, except that a 25 μm-thick biaxially stretched nylon film was used instead of the 3 mm-thick iron sheet. The measurement result of the oxygen permeability of the multilayer structure (3B) is shown in Table 3.

Reference Example 4

A multilayer structure (4B) was obtained in the same manner as in Comparative Example 3, except that a 25 μm-thick biaxially stretched nylon film was used instead of the 3 mm-thick iron sheet. The measurement result of the oxygen permeability of the multilayer structure (4B) is shown in Table 3.

Reference Example 5

A multilayer structure (5B) was obtained in the same manner as in Comparative Example 4, except that a 25 μm-thick biaxially stretched nylon film was used instead of the 3 mm-thick iron sheet. The measurement result of the oxygen permeability of the multilayer structure (5B) is shown in Table 3.

Reference Example 6

A multilayer structure (6B) was obtained in the same manner as in Comparative Example 5, except that a 25 μm-thick biaxially stretched nylon film was used instead of the 3 mm-thick iron sheet. The measurement result of the oxygen permeability of the multilayer structure (6B) is shown in Table 3.

Reference Example 7

A multilayer structure (7B) was obtained in the same manner as in Example 2, except that a 25 μm-thick biaxially stretched nylon film was used instead of the 2.5 mm-thick copper sheet. The measurement result of the oxygen permeability of the multilayer structure (7B) is shown in Table 3.

Reference Example 8

A multilayer structure (8B) was obtained in the same manner as in Example 3, except that a 25 μm-thick biaxially stretched nylon film was used instead of the 2.5 mm-thick copper sheet. The measurement result of the oxygen permeability of the multilayer structure (8B) is shown in Table 3.

Reference Example 9

A multilayer structure (9B) was obtained in the same manner as in Example 4, except that a 25 μm-thick biaxially stretched nylon film was used instead of the 2.5 mm-thick copper sheet. The measurement result of the oxygen permeability of the multilayer structure (9B) is shown in Table 3.

Reference Example 10

A multilayer structure (10B) was obtained in the same manner as in Example 5, except that a 25 μm-thick biaxially stretched nylon film was used instead of the 2.5 mm-thick copper sheet. The measurement result of the oxygen permeability of the multilayer structure (10B) is shown in Table 3.

TABLE 3

| | Oxygen permeability (cc/m² · day · atm) |
|---|---|
| Reference Example 1 | 3 |
| Reference Example 2 | 3 |
| Reference Example 3 | 3 |
| Reference Example 4 | >50 |
| Reference Example 5 | >50 |
| Reference Example 6 | 3 |
| Reference Example 7 | 3 |
| Reference Example 8 | 3 |
| Reference Example 9 | 3 |
| Reference Example 10 | 3 |

The following equation (1) is established for the oxygen permeability of the multilayer structures.

$$1/Pt = 1/Pa + 1/Pb \quad \text{Equation (1)}$$

Pt: Oxygen permeability of the multilayer structure
Pa: Oxygen permeability of layer a
Pb: Oxygen permeability of layer b Because the oxygen permeability of the biaxially stretched nylon film of the substrate exceeds 120 cc/m²·day·atm, and the oxygen permeability of each of the corrosion inhibitor layer, the anchor coating layer, and the resin layer exceeds 100 cc/m²·day·atm, the oxygen permeability of the multilayer structures (1B) to (10B) can be approximated as the oxygen permeability of the coating film.

[Preparation of Coating Solutions]

(13) Preparation of Coating Solution (13)

A coating solution (13) was obtained by gradually mixing 9.2 g of a mixture (VERZONE Green SH-P: manufactured by Daiwa Fine Chemicals Co., Ltd.) of an aromatic compound salt and a heterocyclic compound as the corrosion inhibitor to the coating solution (1) under low-speed stirring (1500 rpm, circumferential velocity 4.1 m/min). The average particle size L of the cleaved montmorillonite in the coating solution (13) was 560 nm, the value a obtained from powder X-ray diffraction was 1.2156 nm, and the aspect ratio Z was 460. Further, based on a total content of the inorganic layered compound and the corrosion inhibitor of 100% by mass, the corrosion inhibitor was 10% by mass.

(14) Preparation of Coating Solution (14)

A coating solution (14) was obtained in the same manner as the coating solution (13), except that the used amount of the corrosion inhibitor was 54 g. The average particle size L of the cleaved montmorillonite in the coating solution (14) was 560 nm, the value a obtained from powder X-ray diffraction was 1.2156 nm, and the aspect ratio Z was 460. Further, based on a total content of the inorganic layered compound and the corrosion inhibitor of 100% by mass, the corrosion inhibitor was 40% by mass.

(15) Preparation of Coating Solution (15)

A coating solution (15) was obtained in the same manner as the coating solution (13), except that the used amount of the corrosion inhibitor was 82 g. The average particle size L of the cleaved montmorillonite in the coating solution (15) was 560 nm, the value a obtained from powder X-ray diffraction was 1.2156 nm, and the aspect ratio Z was 460. Further, based on a total content of the inorganic layered compound and the corrosion inhibitor of 100% by mass, the corrosion inhibitor was 50% by mass.

Example 8

Figure 8:
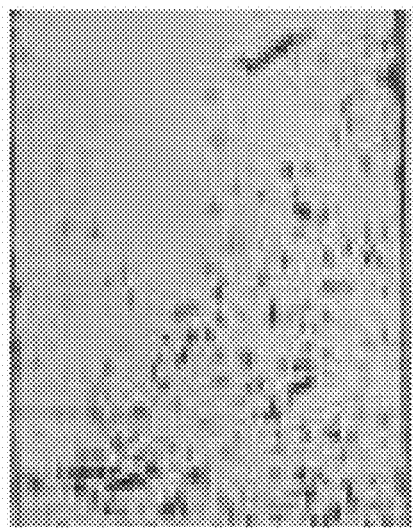
FIG. 8 is a photograph of a multilayer structure (13A) of Example 8 after a metal corrosion test 2.

As a metal layer, a 3 mm-thick copper sheet was used. An anchor coating layer was formed by coating the metal layer with the coating solution (9) using a bar coater (#28), and then drying at 80° C. for 20 minutes. Next, a coating film (13) was formed by coating the anchor coating layer with the above-described coating solution (13) using a bar coater (#8), and then drying at 80° C. for 20 minutes. Then, a resin layer was formed by coating the coating film (13) with the coating solution (10) using a bar coater (#28), and then drying at 80° C. for 20 minutes, to obtain a multilayer structure (13) having a layer structure of metal layer/anchor coating layer/coating film (13)/resin layer. The thickness of the anchor coating layer was 20 μm, the thickness of the coating film (13) was 1 μm, and the thickness of the resin layer was 20 μm. The obtained multilayer structure (13) was subjected to the dry-heat treatment, and then aged for 24 hours under a 23° C., 50% RH atmosphere to obtain a multilayer structure (13A). The multilayer structure (13A) was subjected to the adhesion test and the metal corrosion test 2. The results are shown in Table 4. A photograph of the multilayer structure (13A) after the metal corrosion test 2 is shown in FIG. 8.

Example 9

Figure 9:
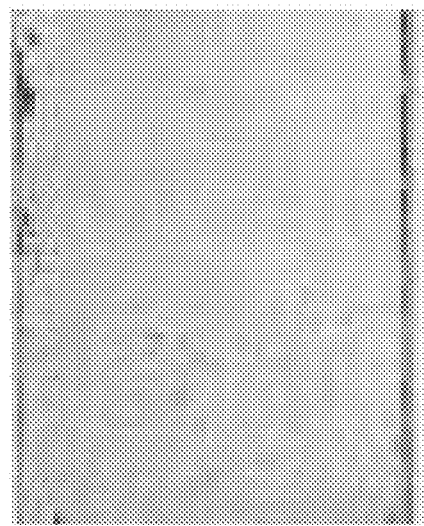
FIG. 9 is a photograph of a multilayer structure (14A) of Example 9 after a metal corrosion test 2.

A multilayer structure (14) having a layer structure of metal layer/anchor coating layer/coating film (14)/resin layer was obtained in the same manner as in Example 8, except that the coating solution (14) was used instead of the coating solution (13). The thickness of the anchor coating layer was 20 μm, the thickness of the coating film (14) was 1 μm, and the thickness of the resin layer was 20 μm. The obtained multilayer structure (14) was subjected to the dry-heat treatment, and then aged for 24 hours under a 23° C., 50% RH atmosphere to obtain a multilayer structure (14A). The multilayer structure (14A) was subjected to the metal corrosion test 2 and the adhesion test. The results are shown in Table 4. A photograph of the multilayer structure (14A) after the metal corrosion test 2 is shown in FIG. 9.

Example 10

Figure 10:
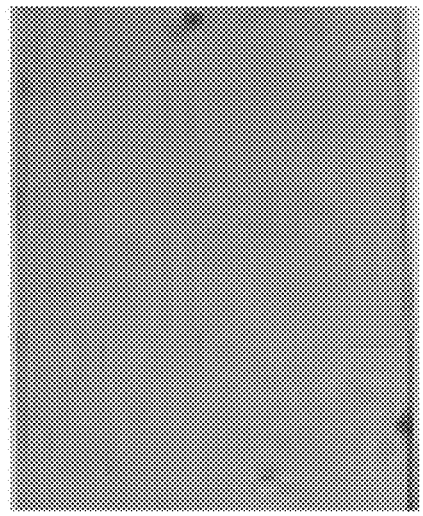
FIG. 10 is a photograph of a multilayer structure (15A) of Example 10 after a metal corrosion test 2.

A multilayer structure (15) having a layer structure of metal layer/anchor coating layer/coating film (15)/resin layer was obtained in the same manner as in Example 8, except that the coating solution (15) was used instead of the coating solution (13). The thickness of the anchor coating layer was 20 μm, the thickness of the coating film (14) was 1 μm, and the thickness of the resin layer was 20 μm. The obtained multilayer structure (15) was subjected to the dry-heat treatment, and then aged for 24 hours under a 23° C., 50% RH atmosphere to obtain a multilayer structure (15A). The multilayer structure (15A) was subjected to the metal corrosion test 2 and the adhesion test. The results are shown in Table 4. A photograph of the multilayer structure (15A) after the metal corrosion test 2 is shown in FIG. 10.

Comparative Example 6

Figure 11:
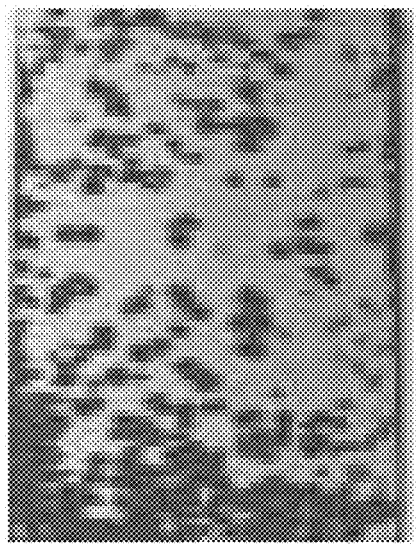
FIG. 11 is a photograph of a multilayer structure (16A) of Comparative Example 6 after a metal corrosion test 2.

A multilayer structure (16) having a layer structure of metal layer/anchor coating layer/coating film (16)/resin layer was obtained in the same manner as in Example 8, except that a coating film (16) was formed using the coating solution (1) instead of the coating solution (13). The thickness of the anchor coating layer was 20 μm, the thickness of the coating film (16) was 1 μm, and the thickness of the resin layer was 20 μm. The obtained multilayer structure (16) was subjected to the dry-heat treatment, and then aged for 24 hours under a 23° C., 50% RH atmosphere to obtain a multilayer structure (16A). The multilayer structure (16A) was subjected to the metal corrosion test 2 and the adhesion test. The results are shown in Table 4. A photograph of the multilayer structure (16A) after the metal corrosion test 2 is shown in FIG. 11.

TABLE 4

|  | Corrosion occurrence (%) | Adhesion |
|---|---|---|
| Example 8 | 13 | ○ |
| Example 9 | 2 | ○ |
| Example 10 | 1> | ○ |
| Comparative Example 6 | 46 | Δ |

REFERENCE SIGNS LIST

1 Metal layer
2 Anchor coating layer
3 Substrate
4 Coating film for prevention of metal corrosion
5 Resin layer
6 Additional layer
10 Multilayer structure A

The invention claimed is:

1. A coating material for prevention of metal corrosion, comprising:
   50 to 99% by mass of an inorganic layered compound having an average particle size of 10 µm or less;
   1 to 50% by mass of a corrosion inhibitor;
   a resin comprising polyvinyl alcohol and polyacrylic acid; and
   a liquid medium;
   wherein the corrosion inhibitor is selected from the group consisting of azoles, inorganic acids, organic acids, and salts of inorganic acids or organic acids,
   the inorganic acid is selected from the group consisting of boric acid, nitrous acid, and phosphonic acid, and
   the organic acid is selected from the group consisting of aliphatic carboxylic acids, aromatic carboxylic acids, alkenyl succinic acids, sarcosinic acids, dibasic acids, organic sulfonic acids, and organic thiocarboxylic acids,
   the aliphatic carboxylic acid is selected from the group consisting of caprylic acid, lauric acid, myristic acid, palmitic acid, stearic acid, arachidic acid, behenic acid, linoleic acid, oleic acid, isobutyric acid, 2-methylbutanoic acid, 2-ethylhexanoic acid, trimethylhexanoic acid, isononanoic acid, isoheptanoic acid, isooctylic acid, isodecanoic acid, isotridecanoic acid, isotetradecanoic acid, isostearic acid, acrylic acid, methacrylic acid, oxalic acid, succinic acid, adipic acid, glutaric acid, pimelic acid, azelaic acid, sebacic acid, cyclohexanedicarboxylic acid, maleic acid, fumaric acid, dodecanedioic acid, dodecadienedioic acid, isobutane tricarboxylic acid, lactic acid, hydroxypivalic acid, dimethylolpropionic acid, citric acid, malic acid, and glycerin acid, the aromatic carboxylic acid is selected from the group consisting of isopropylbenzoic acid, p-tert-butylbenzoic acid, isooctylbenzoic acid, isononylbenzoic acid, benzoic acid, phthalic acid, isophthalic acid, trimellitic acid, and pyromellitic acid, and
   the organic sulfonic acid is petroleum sulfonic acid;
   wherein the content of the inorganic layered compound and the content of the corrosion inhibitor are each based on a total content of the inorganic layered compound and the corrosion inhibitor being 100% by mass.

2. The coating material for prevention of metal corrosion according to claim 1, wherein an aspect ratio of the inorganic layered compound is 20 to 2000.

3. A process for producing a coating film for prevention of metal corrosion, the process comprising:
   a coating step of coating a substrate with the coating material for prevention of metal corrosion according to claim 1; and
   a drying step of removing the liquid medium from the coating material used for coating in the coating step to obtain a coating film.

4. The process according to claim 3, wherein the substrate comprises a metal layer.

5. A coating film for prevention of metal corrosion, comprising:
   50 to 99% by mass of an inorganic layered compound having an average particle size of 10 µm or less;
   1 to 50% by mass of a corrosion inhibitor; and
   a resin comprising polyvinyl alcohol; and polyacrylic acid,
   wherein the corrosion inhibitor is selected from the group consisting of azoles, inorganic acids, organic acids, and salts of inorganic acids or organic acids,
   the inorganic acid is selected from the group consisting of boric acid, nitrous acid, and phosphonic acid, and
   the organic acid is selected from the group consisting of aliphatic carboxylic acids, aromatic carboxylic acids, alkenyl succinic acids, sarcosinic acids, dibasic acids, organic sulfonic acids, and organic thiocarboxylic acids,
   the aliphatic carboxylic acid is selected from the group consisting of caprylic acid, lauric acid, myristic acid, palmitic acid, stearic acid, arachidic acid, behenic acid, linoleic acid, oleic acid, isobutyric acid, 2-methylbutanoic acid, 2-ethylhexanoic acid, trimethylhexanoic acid, isononanoic acid, isoheptanoic acid, isooctylic acid, isodecanoic acid, isotridecanoic acid, isotetradecanoic acid, isostearic acid, acrylic acid, methacrylic acid, oxalic acid, succinic acid, adipic acid, glutaric acid, pimelic acid, azelaic acid, sebacic acid, cyclohexanedicarboxylic acid, maleic acid, fumaric acid, dodecanedioic acid, dodecadienedioic acid, isobutane tricarboxylic acid, lactic acid, hydroxypivalic acid, dimethylolpropionic acid, citric acid, malic acid, and glycerin acid,
   the aromatic carboxylic acid is selected from the group consisting of isopropylbenzoic acid, p-tert-butylbenzoic acid, isooctylbenzoic acid, isononylbenzoic acid, benzoic acid, phthalic acid, isophthalic acid, trimellitic acid, and pyromellitic acid, and
   the organic sulfonic acid is petroleum sulfonic acid;
   wherein the content of the inorganic layered compound and the content of the corrosion inhibitor are each based on a total content of the inorganic layered compound and the corrosion inhibitor being 100% by mass.

6. A multilayer structure in which a substrate comprising a metal layer and the coating film for prevention of metal corrosion according to claim 5 are laminated.

7. The multilayer structure according to claim 6, wherein the substrate comprising the metal layer is a substrate comprising a metal layer and an anchor coating layer, and
   the multilayer structure comprises the anchor coating layer between the metal layer and the coating film for prevention of metal corrosion.

* * * * *